United States Patent
Marshall et al.

(10) Patent No.: US 10,156,960 B2
(45) Date of Patent: *Dec. 18, 2018

(54) VEHICLE DIAGNOSTIC SYSTEMS AND METHODS

(71) Applicant: ALLDATA LLC, Elk Grove, CA (US)

(72) Inventors: Paul A. Marshall, Sacramento, CA (US); Jeffery W. Lagges, Auburn, CA (US)

(73) Assignee: ALLDATA LLC, Elk Grove, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 15/339,087

(22) Filed: Oct. 31, 2016

(65) Prior Publication Data
US 2017/0046048 A1    Feb. 16, 2017

Related U.S. Application Data

(63) Continuation of application No. 14/522,716, filed on Oct. 24, 2014, now Pat. No. 9,513,789.

(60) Provisional application No. 61/895,283, filed on Oct. 24, 2013.

(51) Int. Cl.
| | |
|---|---|
| *G06F 3/0481* | (2013.01) |
| *G06F 3/0484* | (2013.01) |
| *G07C 5/00* | (2006.01) |
| *H04W 4/80* | (2018.01) |
| *G07C 5/08* | (2006.01) |
| *G06F 3/0488* | (2013.01) |

(52) U.S. Cl.
CPC ........ *G06F 3/04817* (2013.01); *G06F 3/0488* (2013.01); *G06F 3/04847* (2013.01); *G07C 5/008* (2013.01); *G07C 5/0808* (2013.01); *H04W 4/80* (2018.02)

(58) Field of Classification Search
CPC .................................................. G06F 3/04817
USPC ......................................................... 715/825
See application file for complete search history.

(56) References Cited

U.S. PATENT DOCUMENTS

| | | |
|---|---|---|
| 5,680,328 A | 10/1997 | Skorupski et al. |
| 6,181,994 B1 | 1/2001 | Colson et al. |
| 6,236,917 B1 | 5/2001 | Liebl et al. |

(Continued)

OTHER PUBLICATIONS

Canadian Office Action for related Canadian Application No. 2,868,573, dated Feb. 17, 2016.

*Primary Examiner* — William D Titcomb
(74) *Attorney, Agent, or Firm* — Alston & Bird LLP

(57) ABSTRACT

A system for diagnosing and repairing vehicles is provided. An example apparatus includes a vehicle interface configured to transmit one or more instructions to an adaptor connected to a vehicle and retrieve an indication of one or more diagnostic trouble codes from the adaptor. The apparatus includes a communication module configured to transmit the diagnostic trouble codes to a remote server along with a user identifier or a vehicle identification number, and receive repair information from the remote server. The apparatus further includes a user interface configured to receive user requests for information and to display information regarding the adaptor, the vehicle information, the one or more diagnostic trouble codes, and/or the repair information. Finally, the apparatus includes a memory and a processor configured to control the vehicle interface, the communication module, the user interface, and the memory.

20 Claims, 24 Drawing Sheets

(56) References Cited

U.S. PATENT DOCUMENTS

| | | |
|---|---|---|
| 6,295,492 B1 | 9/2001 | Lang et al. |
| 6,330,499 B1 | 12/2001 | Chou et al. |
| 6,472,771 B1 | 10/2002 | Frese et al. |
| 6,526,340 B1 | 2/2003 | Reul et al. |
| 6,556,904 B1 | 4/2003 | Larson et al. |
| 6,732,032 B1 | 5/2004 | Banet et al. |
| 6,807,469 B2 | 10/2004 | Funkhouser et al. |
| 6,874,680 B1 | 4/2005 | Klaus et al. |
| 6,933,842 B2 | 8/2005 | Osterling et al. |
| 6,941,203 B2 | 9/2005 | Chen |
| 7,085,680 B2 | 8/2006 | Huang |
| 7,209,813 B2 | 4/2007 | Namaky |
| 7,212,893 B2 | 5/2007 | Doherty et al. |
| 7,437,227 B2 | 10/2008 | Andreasen et al. |
| 7,444,216 B2 | 10/2008 | Rogers et al. |
| 7,487,018 B2 | 2/2009 | Afshar et al. |
| 7,505,837 B2 | 3/2009 | Somos |
| 7,571,034 B2 | 8/2009 | Raichle et al. |
| 7,620,484 B1 | 11/2009 | Chen |
| 7,715,959 B2 | 5/2010 | Silvester |
| 7,856,298 B2 | 12/2010 | Raichle et al. |
| 7,928,837 B2 | 4/2011 | Drew et al. |
| 7,987,028 B2 | 7/2011 | Bertosa et al. |
| 8,090,495 B2 | 1/2012 | Fink et al. |
| 8,145,377 B2 | 3/2012 | Gilbert |
| 8,188,704 B2 | 5/2012 | Reese et al. |
| 8,229,693 B2 | 7/2012 | Willard et al. |
| 8,285,439 B2 | 10/2012 | Hodges |
| 8,340,855 B2 | 12/2012 | Chinnadurai et al. |
| 8,340,861 B2 | 12/2012 | Lipscomb et al. |
| 8,364,339 B2 | 1/2013 | Willard et al. |
| 8,370,018 B2 | 2/2013 | Andreasen et al. |
| 8,473,145 B2 | 6/2013 | Biswas et al. |
| 9,215,547 B2 | 12/2015 | Marsden et al. |
| 9,513,789 B2 * | 12/2016 | Marshall .............. G07C 5/0808 |
| 2002/0016655 A1 | 2/2002 | Joao |
| 2003/0171111 A1 * | 9/2003 | Clark ...................... H04L 67/14 |
| | | 455/414.1 |
| 2005/0234616 A1 | 10/2005 | Oliver et al. |
| 2008/0119981 A1 | 5/2008 | Chen |
| 2008/0201032 A1 | 8/2008 | Fayyad et al. |
| 2009/0259358 A1 | 10/2009 | Andreasen |
| 2011/0077817 A1 | 3/2011 | Sun et al. |
| 2012/0041637 A1 | 2/2012 | Allemang |
| 2012/0322377 A1 | 12/2012 | Alrabady |
| 2013/0054082 A1 | 2/2013 | Constantino |
| 2013/0204485 A1 | 8/2013 | Chen et al. |
| 2017/0180012 A1 * | 6/2017 | Tingler .............. G06K 7/10297 |

* cited by examiner

ALLDATA

CURRENT VEHICLE
- VIN: 3GNFK16T72G221242
- YEAR: 2002
- MAKE: CHEVY TRUCK
- MODEL: K 1500 SUBURBAN 4WD
- ENGINE: V8-5.3L VIN T

CHANGE VEHICLE

PREVIOUS VEHICLE
- 2002 CHEVY TRUCK K 1500 SUBURBAN 4WD V8-5.3L VIN T 3GNFK16T72G221242
- 2011 ACURA TL AWD V6-3.7L
- 1994 CHEVROLET CAVALIER/7241 L4-134 2.2L VIN: 1G1JC5444R7252367
- 2009 CHEVROLET MALIBU L4-2.4L
- 2006 MITSUBISHI ECLIPSE V6-3.8L (6G75)

REPAIR INFORMATION
- VEHICLE
- A L L DIAGNOSTIC TROUBLE CODES (DTC)
- ACCESSORIES AND OPTIONAL EQUIPMENT
- BODY AND FRAME
- BRAKES AND TRACTION CONTROL
- CRUISE CONTROL
- ENGINE, COOLING AND EXHAUST
- HEATING AND AIR CONDITIONING
- INSTRUMENT PANEL, GAUGES AND WARNING INDICATORS
- LIGHTING AND HORNS
- MAINTENANCE
- POWER AND GROUND DISTRIBUTION
- POWERTRAIN MANAGEMENT

DIAGNOSTIC TROUBLE CODES

VIEW MORE TROUBLE CODES

DASHBOARD

DTC | MAINTENANCE | TSBs/RECALLS | BACK

ALLDATA

CURRENT VEHICLE
VIN: 3GNFK16T726221242
YEAR: 2002
MAKE: CHEVY TRUCK
MODEL: K 1500 SUBURBAN 4WD
ENGINE: V8-5.3L VIN T

CHANGE VEHICLE

PREVIOUS VEHICLE
- 2002 CHEVY TRUCK K 1500 SUBURBAN 4WD V8-5.3L VIN T 3GNFK16T726221242
- 2011 ACURA TL AWD V6-3.7L
- 1994 CHEVROLET CAVALIER/724 L4-134 2.2L VIN:1G1JC5444R7252367
- 2009 CHEVROLET MALIBU L4-2.4L
- 2006 MITSUBISHI ECLIPSE V6-3.8L (6G75)

REPAIR INFORMATION
- VEHICLE
- A L L DIAGNOSTIC TROUBLE CODES (DTC)
- ACCESSORIES AND OPTIONAL EQUIPMENT
- BODY AND FRAME
- BRAKES AND TRACTION CONTROL
- CRUISE CONTROL
- ENGINE, COOLING AND EXHAUST
- HEATING AND AIR CONDITIONING
- INSTRUMENT PANEL, GAUGES AND WARNING INDICATORS
- LIGHTING AND HORNS
- MAINTENANCE
- POWER AND GROUND DISTRIBUTION
- POWERTRAIN MANAGEMENT

DIAGNOSTIC TROUBLE CODES

STORED DTCs:
- P0012:A CAMSHAFT POSITION - TIMING OVER-RETARDED - BANK 1
- P0011:A CAMSHAFT POSITION - TIMING OVER-ADVANCED OR SYSTEM PERFORMANCE - BANK 1
- P0012:A CAMSHAFT POSITION - TIMING OVER-RETARDED - BANK 1
- P0420: CATALYST SYSTEM EFFICIENCY BELOW THRESHOLD - BANK 1

VIEW MORE TROUBLE CODES

DASHBOARD

DTCs | MAINTENANCE | TSBs/RECALLS

BACK

CURRENT VEHICLE
2002 CHEVY TRUCK K 1500 SUBURBAN 4WD
V8-5.3L VIN T
3GFK16T72G221242

SELECT NEW

OBDLINK MX

RECENT VEHICLES

- 2002 CHEVY TRUCK K 1500 SUBURBAN 4WD V8-5.3L VIN T 3GNFK16T72G221242
- 2005 MINI COOPER S (R53) L4-1.6L SC (W11)
- 2013 AUDI A3 QUATTRO (8PA) L4-2.0L TURBO (CCTA)

REPAIR INFORMATION

- VEHICLE
- A L L DIAGNOSTIC TROUBLE CODE...
- ACCESSORIES AND OPTIONAL EQUI...
- BODY AND FRAME
- BRAKES AND TRACTION CONTROL
- CRUISE CONTROL
- ENGINE, COOLING AND EXHAUST
- HEATING AND AIR CONDITIONING
- INSTRUMENT PANEL, GAUGES AND...
- POWER AND GROUND DISTRIBUTION
- POWERTRAIN MANAGEMENT
- RELAYS AND MODULES
- RESTRAINTS AND SAFETY SYSTEMS
- SENSORS AND SWITCHES
- STARTING AND CHARGING
- STEERING AND SUSPENSION
- TRANSMISSION AND DRIVETRAIN
- WINDOWS AND GLASS

FIG. 4E

VEHICLE DIAGNOSTIC SYSTEMS AND METHODS

CROSS-REFERENCE TO RELATED APPLICATIONS

This application is a continuation of U.S. patent application Ser. No. 14/522,716, filed Oct. 24, 2014, which claims the benefit of U.S. Provisional Patent Application No. 61/895,283, filed on Oct. 24, 2013. The entire disclosures of these applications are incorporated herein by reference.

TECHNOLOGICAL FIELD

Example embodiments of the present invention relate generally to vehicle maintenance and, more particularly, to a method, apparatus, and computer program product for improving the process of diagnosing and repairing vehicles.

BACKGROUND

Applicant has discovered problems with current vehicle diagnostic tools. Through applied effort, ingenuity, and innovation, many problems with existing diagnostic tools, methodologies, and systems are solved by the present invention, which is described in detail below.

BRIEF SUMMARY

A number of challenges are currently experienced by today's technicians. These challenges include limitations of current diagnostic hardware utilized within repair facilities, repair information lacking interactivity, and the challenge of maintaining many diagnostic tools, each having their own information sources. In short, technicians need to subscribe to multiple PC-based repair information sources, and must use multiple diagnostic tools each having their own information sources, resulting in subscription-fee fatigue.

For access to repair information through desktop PCs and laptops, sub-optimal behavior is common. Repair facilities often utilize one or two stand-alone units that technicians are allowed to share. The result is lost productivity due to technicians having to form a line to use the units and due to technicians having to traverse the shop floor to utilize this repair information source, and then having to walk back to the repair bay. In some instances technicians are required to print and then carry the required procedures to the bay, which does not leave room for error, or ease of access to additional follow-up information. Although laptops are slightly more convenient, technicians experience the same issue of having to share a limited number of laptops. In addition, technicians tend to have limited flat space to access laptops within a repair bay. A common result is that the technician must precariously balance the laptop while trying to navigate repair information.

For diagnostic tools, it has become increasingly common for repair facilities to support a multitude of devices, each having its own associated fees and software (including concomitant software/firmware updates). These systems vary from entry-level hand-held scan devices, to OE level diagnostic scanners. Each such system, however, is disconnected from the others, and there is no centralized data store that conveniently collates data from all sources. Moreover, most such systems are disconnected from any web-based information source entirely, and consequently introduce inconvenience into the process of gathering relevant information.

Similarly, prior art systems typically require separate tools for the different manufacturers. Accordingly, a need exists for a tool that provides access to information from multiple OEM manufacturers, rather than only some subset thereof.

For web-based repair information access, current systems are designed for technicians to manually enter vehicle year, make, model, and engine (YMME) information, and then follow repair procedures, with no interactivity. In other words, current web-based information retrieval systems follow a simplistic paradigm that is prone to data entry errors.

All of the above problems contribute to repair inefficiency in repair facilities and produce negative impacts on profit margin, repair speed, and cost to consumers.

To address some of these weaknesses of current shop platforms, a method, apparatus, and computer program product are provided in accordance with example embodiments of the present invention to improve the diagnosis and repair of vehicles. Embodiments of the present invention offer the convenience, reliability, durability, and low operational cost of current tablet application technology. Embodiments of the present invention further offer the ability to transport repair information anywhere as needed (avoiding the inconvenience of immobile stand-alone units), and offer expanded functionality not otherwise available through devices (e.g., laptops) that are not easily carried or handled in a repair bay. Moreover, embodiments of the present invention leverage tablet technology by providing expanded functionality not available through traditional web browsers, and providing a touchscreen-enabled user interface (UI) having repair information types laid out within an easy-to-use grid format.

In addition, using embodiments of the present invention, technicians are able to connect to vehicles through the on-board diagnostics (OBD) port of a vehicle, automatically read vehicle identification number (VIN) information, and retrieve relevant repair information and identify diagnostic trouble codes (DTCs, or "codes") as part of an initial diagnostic process. This functionality bridges the gap between repair information and vehicle connectivity. Moreover, using OBD parameter IDs (i.e., PIDs, such as those defined in the SAE J1979 standard, which is incorporated herein by reference in its entirety) to request data from a vehicle, embodiments of the present invention are able to retrieve corresponding DTCs (such as p-codes, a particular type of code), correlate these codes to specific repair articles, and store either the codes, the repair articles, or both, within a user's account in conjunction with the affected vehicle's VIN.

Embodiments of the present invention provide repair information served through the convenience, reliability, durability, and low operational cost of tablet application technology. In this regard, the present invention may enable technicians to transport repair information anywhere as needed, with expanded functionality not available through traditional systems, thus mitigating the need to wait in lines to access terminals. Accordingly, embodiments of the present invention may overcome inefficiencies of traditional vehicle maintenance systems, and provide a competitive advantage to maintenance facilities.

The above summary is provided merely for purposes of summarizing some example embodiments to provide a basic understanding of some aspects of the invention. The above-described embodiments are merely examples and should not be construed to narrow the scope or spirit of the invention in any way. It will be appreciated that the scope of the present invention encompasses many potential embodiments including those here summarized, some of which will be further described below.

BRIEF DESCRIPTION OF THE DRAWINGS

Figure 1:
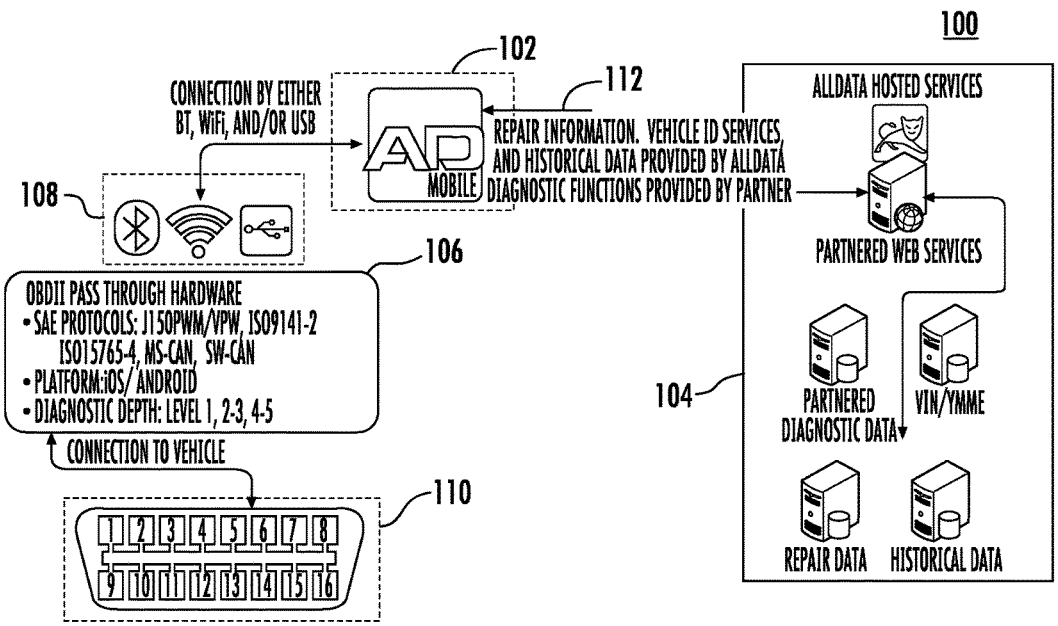
Figure 2:
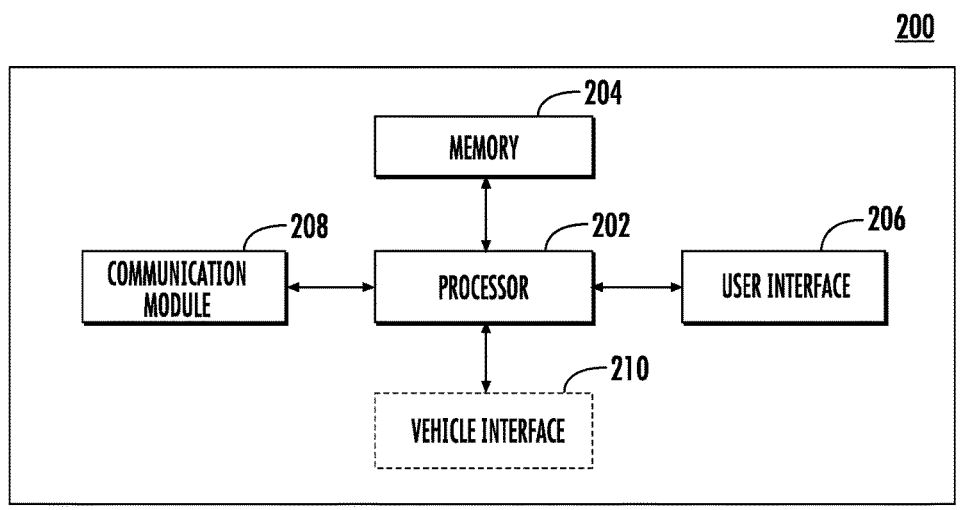
Figure 3A:
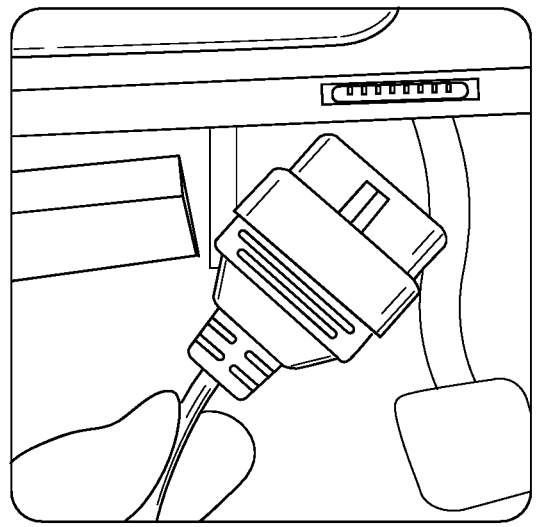
Figure 3B:
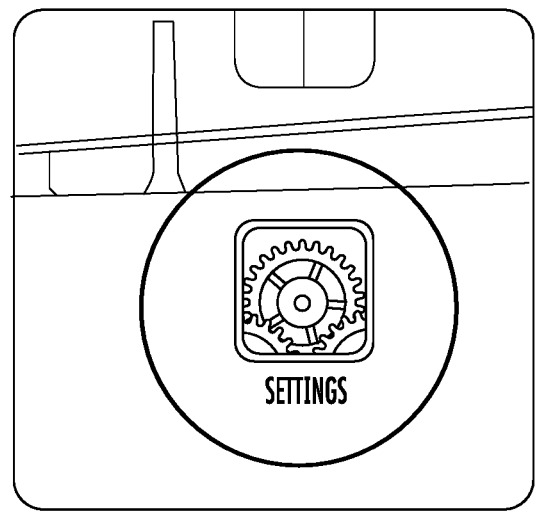
Figure 3C:
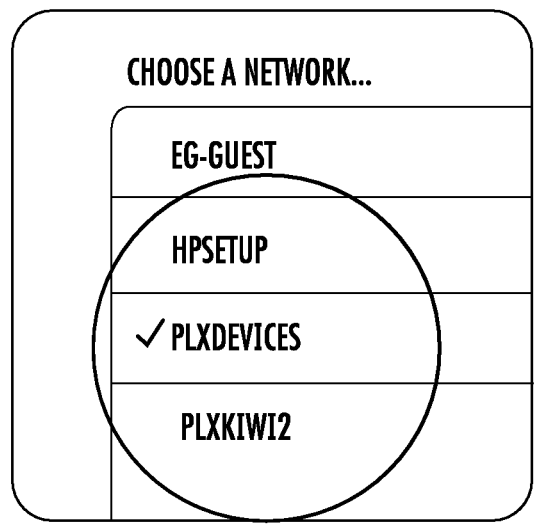
Figure 3D:
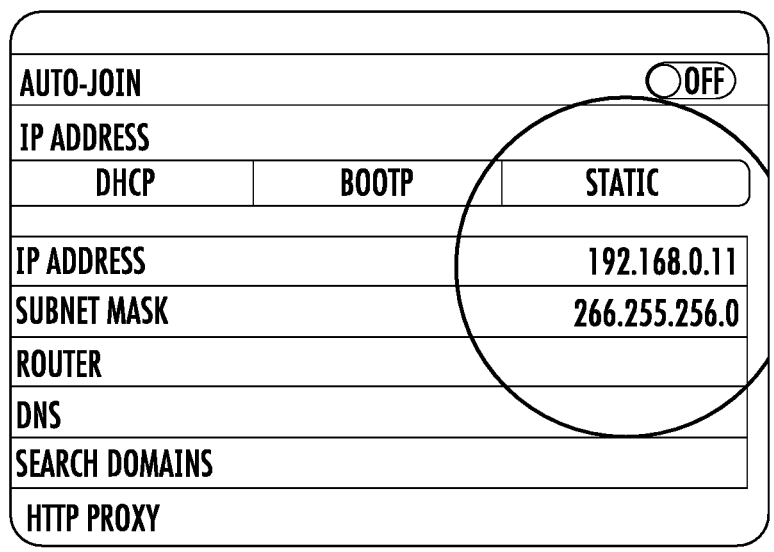
Figure 3E:
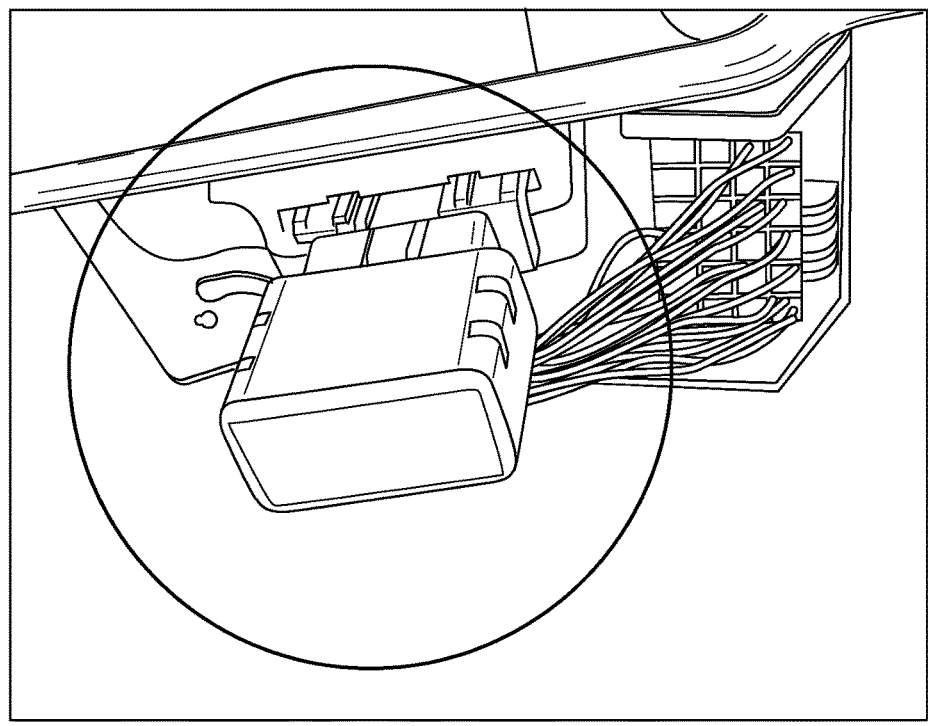
Figure 3F:
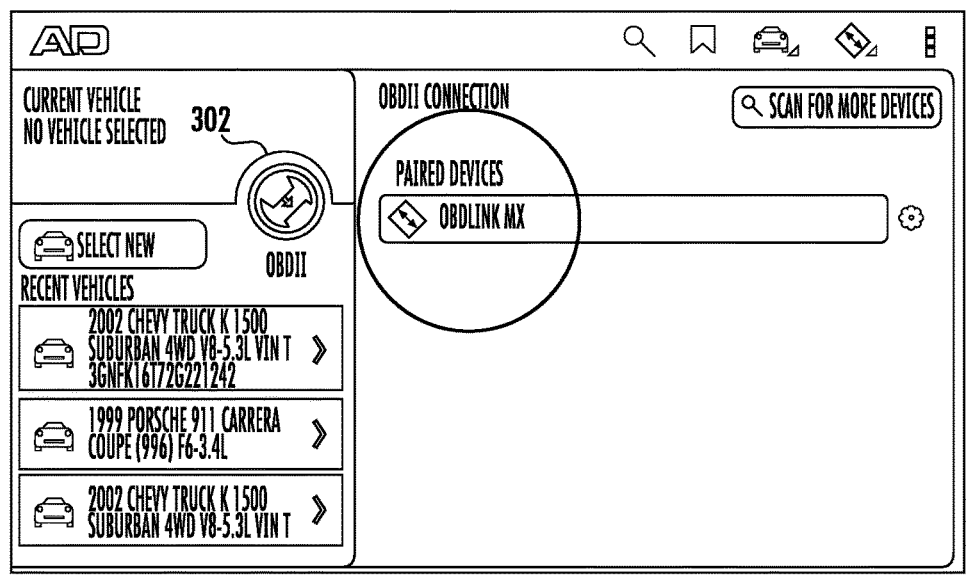
Figure 3G:
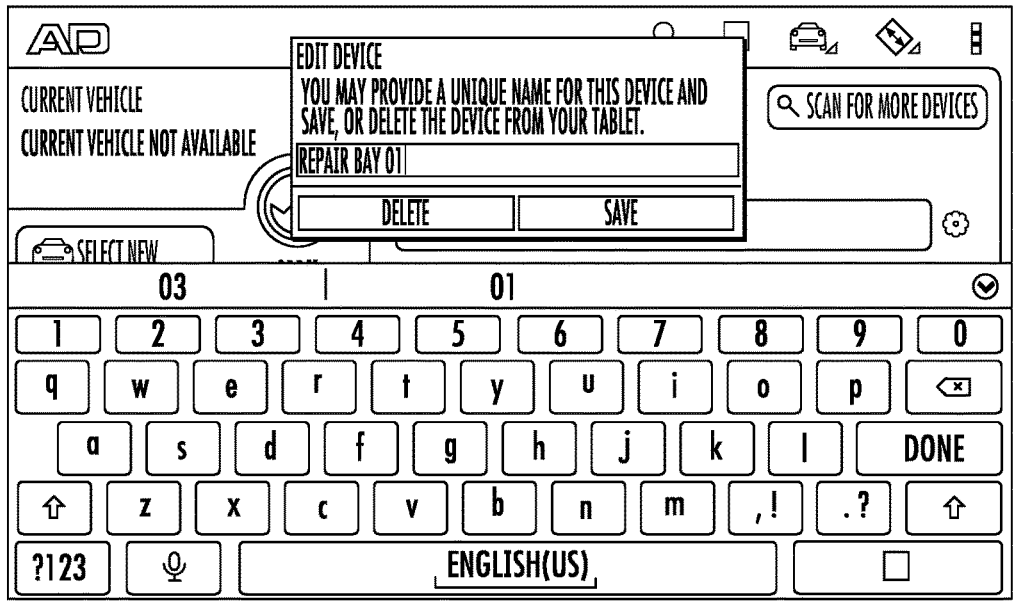
Figure 3H:
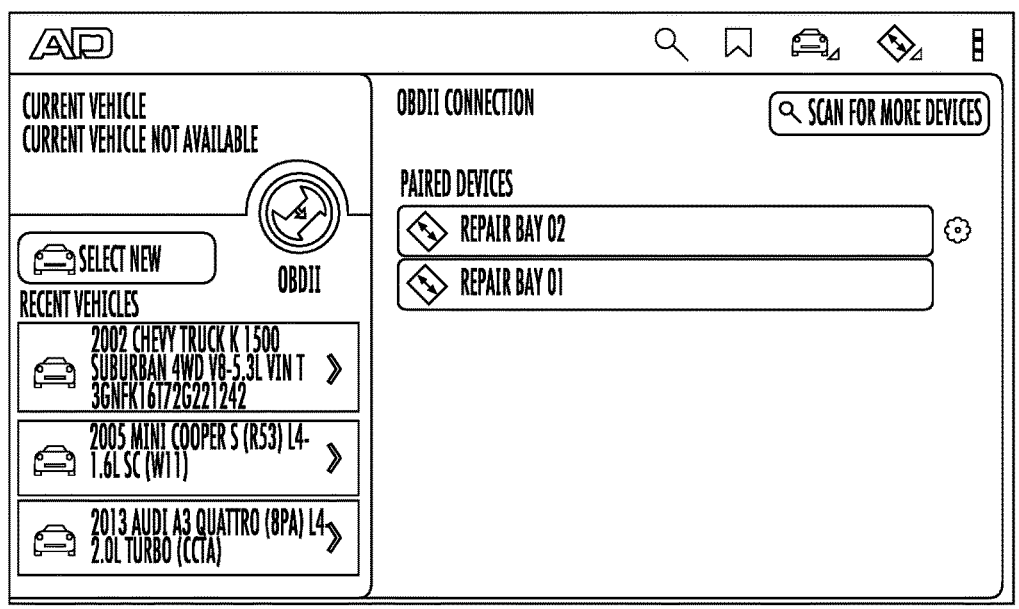

Having thus described certain example embodiments of the present disclosure in general terms, reference will now be made to the accompanying drawings, which are not necessarily drawn to scale, and wherein:

FIG. 1 illustrates a system within which embodiments of the present invention may operate, in accordance with example embodiments;

FIG. 2 illustrates a block diagram showing an example device for use in a promotional server, in accordance with some example embodiments;

FIG. 3A illustrates a cable with an adaptor that may be connected to a vehicle OBD port, in accordance with example embodiments;

FIGS. 3B through 3D illustrate user interfaces via which a wireless connection to an adaptor may be configured, in accordance with example embodiments;

FIG. 3E illustrates another adaptor that may be connected to a vehicle OBD port, in accordance with example embodiments;

FIG. 3F illustrates a user interface via which a wireless connection to an adaptor may be configured, in accordance with example embodiments;

FIG. 3G illustrates a user interface via which descriptive information regarding an adaptor may be modified, in accordance with example embodiments;

FIG. 3H illustrates a user interface via which a wireless connection to one of multiple adaptors can be configured, in accordance with example embodiments;

FIGS. 4A through 4D illustrate portions of an example main user interface via which a technician may deploy some example embodiments;

FIGS. 4E through 4J illustrate examples of alternative interfaces via which a technician may deploy some example embodiments; and FIGS. 5A through 5M illustrate various interfaces with which a technician may interact to assist in the diagnosis and configuration of a connected vehicle, in accordance with example embodiments.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

System Architecture

FIG. 1 discloses an example computing system 100 within which embodiments of the present invention may operate. In this regard, the method, apparatus, and computer program product of an example embodiment may be embodied by a computing device 102, such as a tablet computer (e.g., an Apple iPad™, Samsung Galaxy Tab™, Google Nexus™, Microsoft Surface™, or the like), configured to communicate with one or more vehicles via an OBD port 110 (e.g., a port in accordance with OBD-II, EOBD, JOBD, ADR 79/01, ADR 79/02, J2534, or any other standard by which a device may communicate with a vehicle's on-board computer), and further configured to communicate with a server 104 via a network 112, such as a local area network (LAN), or a wide area network (e.g., the Internet). In some embodiments, the computing device may be embodied by any of a variety of other mobile terminals, such as a portable digital assistant (PDA), mobile telephone, smartphone, laptop computer, or any combination of the aforementioned devices.

Server 104 may comprise a web server connected to the Internet, and may comprise several constituent elements. For instance, server 104 may include one or more databases storing partnered diagnostic data, VIN/YMME data, repair data (such as repair instructions, information regarding DTCs, p-codes, or the like), and historical data regarding one or more OEM manufacturers, one or more users, or one or more vehicles. By storing a comprehensive set of information, these databases mitigate the traditional problem in which multiple tools are required to gather information for different manufacturers, and enables repair facilities to replace multiple tools with a single tool. Similarly, by reducing reliance on a multitude of tools, embodiments of the present invention may mitigate the problem of subscriber-fee fatigue.

The system shown in FIG. 1 may further include an adaptor 106 (e.g., a PLX Kiwi™, Kiwi™ 2, OBDLink MX, OBDLink LX, or other similar device) via which the computing device 102 connects to OBD port 110. In this regard, adaptor 106 may connect directly to OBD port 110, and may be configured to connect to computing device 102 via Bluetooth™, Wi-Fi™, universal serial bus (USB), or any other wired/wireless connection.

The computing device 102 may be embodied by a computing system, such as apparatus 200 shown in FIG. 2. As illustrated in FIG. 2, the apparatus 200 includes a processor 202, memory 204, user interface 206, communications module 208, and may in some embodiments include vehicle interface 210. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with example embodiments of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the apparatus 200 to cause the processor to execute the algorithms and/or operations described herein.

In some embodiments, the apparatus 200 may include a user interface 206 that may, in turn, be in communication with processor 202 to provide output to the user and to receive an indication of a user input. The user interface 206 may include a display and may comprise a web user interface, a mobile application, a client device, a kiosk, or the like. In some embodiments, the user interface 206 may also include a keyboard, a mouse, a joystick, a touchscreen, touch areas, soft keys, a microphone, a speaker, a camera, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

Meanwhile, the communication module 208 may be any device or circuitry embodied in either hardware or a combination of hardware and software that is configured to receive and/or transmit data to or from a server 104 in communication with the apparatus 200. In this regard, the communication module 208 may include, for example, an antenna (or multiple antennas) and supporting hardware and/or software for enabling communications with a wireless communication network. Additionally or alternatively, the communication module 208 may include the circuitry for interacting with the antenna(s) to cause transmission of signals via the antenna(s) or to handle receipt of signals received via the antenna(s). In some environments, the communication module 208 may additionally or alternatively support wired communication. As such, for example, the communication module 208 may include a modem and/or other hardware/software for supporting communication via cable, digital subscriber line (DSL), universal serial bus (USB), or other mechanisms. The communication module 208 may additionally send and retrieve data from peripheral devices such as a printer or point-of-sale terminal (not shown in FIG. 2), and in some embodiments, the communication module 208 may facilitate the transmission of received information via the Internet (e.g., via email, text messaging, social media platforms, or the like).

In some embodiments, the apparatus 200 may further include vehicle interface 210, which is configured to enable communication between the apparatus 200 and a vehicle's on-board circuitry via the vehicle's OBD port 110. The vehicle interface 210 may in some embodiments comprise adaptor 106, as described above. Alternatively, the vehicle interface 210 may comprise a component configured to communicate with adaptor 106 via a wired/wireless connection, as described above. Accordingly, vehicle interface 210 enables communication between the apparatus 200 and a vehicle, in close proximity or remotely.

Server 104 may also be embodied by a computing system such as apparatus 200 illustrated in FIG. 2. In this regard, server 104 may include a processor 202, memory 204, and communication module 208, and may optionally include a user interface 206. Server 104 may process, host, and publish large amounts of content relevant to vehicle DTCs, p-codes, problem diagnosis, and repair instructions, wherein such information is accessible by a technician via computing device 102.

Server 104 need not include vehicle interface 210, and in some embodiments may not communicate directly with a vehicle. In such embodiments, server 104 may function as a database that can be queried via communication module 208 (e.g., by computing device 102) and may provide information relevant to particular queries, such as repair instructions relevant to specific DTCs, or related to particular users or vehicles (e.g., by uploading related DTC information to a computing device 102 upon login by a particular user or connection of the computing device 102 to a particular vehicle). Alternatively, in some embodiments, server 104 may itself include a vehicle interface 210, and may accordingly be configured to retrieve data from a vehicle irrespective of the operation of a computing device 102. Server 104 may accordingly retrieve and store DTCs for subsequent reference or download by computing device 102 or merely for storage as historical data. Similarly, server 104 may locate information relevant to retrieved DTCs for efficient retrieval upon request by computing device 102. In yet another alternative, in some embodiments computing device 102 and server 104 may comprise a single system or device including vehicle interface 210. In some such embodiments, the combined system may comprise a sufficiently powerful device usable by a technician.

Server 104 may further perform additional tasks related to vehicle diagnostics and repair. For instance, by collecting historical data (e.g., user information, vehicle information, and DTCs associated with particular users and/or vehicles over time), server 104 may, in some embodiments, mine the collected data to develop diagnostic predictions based on the historical data and statistically significant correlations between various elements of the historical data. For instance, server 104 may determine likely problems for a first vehicle based on historical DTC information of similarly situated vehicles, and in this regard may identify problems endemic to particular vehicle years, makes, models, engines, or even manufacturers. Server 104 may determine estimates of when, during a vehicle's lifetime, DTCs are likely to occur, and may identify combinations of DTCs that frequently occur together, and may even, in some embodiments, identify statistically significant correlations between DTC information and particular users or regions, or even seasonal changes in DTC occurrences. In some embodiments, the server 104 may transmit such information to computing device 102 in response to receiving, from the computing device 102, user identifying information, vehicle information (e.g., VIN or YMME), or any sequence of information suggesting the relevance of such statistical data.

Application Architecture and User Interface

As noted above, a method, apparatus, and computer program product are provided in accordance with example embodiments of the present invention to improve the diagnosis and repair of vehicles. Embodiments of the present invention offer the convenience, reliability, durability, and low operational cost of current tablet application technology. Embodiments of the present invention further offer the ability to transport repair information anywhere as needed (thus avoiding the inconvenience of immobile stand-alone units), and offer expanded functionality not otherwise available through devices (e.g., laptops) that are not easily carried or handled in a repair bay. By providing the technician with a tablet device, embodiments of the present invention may eliminate the problem of having to precariously balance a laptop on the small or uneven surfaces within a repair facility. Moreover, embodiments of the present invention leverage tablet technology by providing expanded functionality not available through traditional web browsers, and providing a touchscreen-enabled user interface (UI) having repair information types laid out within an easy-to-use grid format.

To streamline the process of diagnosing and repairing vehicles, embodiments of the present invention execute software stored on computing device 102. This software may enable technicians to quickly and accurately identify vehicles, locate DTCs corresponding to potential vehicle faults, and retrieve information relevant to diagnosing problems and repairing them. In this regard, the application software may include three types of operation: (1) reading/saving/clearing standard DTCs (including linking to associated articles from server 104) via interfaces including the SAE J2534-2 standard, emissions monitoring checks, displaying data from a number of on-board modules in a variety of formats (list, graph, etc.), and providing access to non-powertrain protocols (e.g., ABS, SRS, BCM); (2) reading/saving/clearing DTCs related to powertrain (ECM, PCM, TCM), including chassis and body systems; and (3) bi-directional testing, adapting, coding, and programming of vehicle on-board circuitry (e.g., using the SAE J2534-2 standard).

Initially, computing device 102 may establish a connection, via adaptor 106, with OBD port 110 of a vehicle. This may occur in at least three distinct ways. As shown in FIG. 3A, in some embodiments establishing a connection to the vehicle may be as simple as plugging a cable connected to adaptor 106 into the OBD port 110 of the vehicle, after which this physical connection triggers identification of the adaptor 106 by computing device 102. In other embodiments, the computing device 102 may be connected wirelessly to the adaptor. In one such embodiment, a Wi-Fi connection may be established as shown in FIGS. 3B through 3D. In this regard, to connect to adaptor 106 via a Wi-Fi connection, the technician may select Wi-Fi settings in computing device 102, as shown in FIG. 3B. In FIG. 3C, the technician may select the Wi-Fi connection associated with adaptor 106. Finally, in FIG. 3D, the technician may select a "static" IP address setting and enter the appropriate IP address and subnet mask associated with adaptor 106.

In another such embodiment, the computing device 102 may connect to adaptor 106 (e.g., an OBDLink MX, shown in FIG. 3E) via other wireless means (Bluetooth™, or the like), in which case one or more adaptor 106 may be automatically detected by the computing device 102, and may appear as a selectable icon, as shown in FIG. 3F. In one embodiment, from the example user interface shown in FIG. 3F, if the user selects the "OBDII" icon 302, the computing device 102 initiates a scan for compatible adaptors 106. The computing device 102 can present a user interface that displays one or more icons including descriptive information regarding the compatible adaptors. FIG. 3F shows the user interface after pairing with a particular adaptor. Upon selection of the "gear" icon to the right of the circled adaptor, the user may enter a new name for the adaptor, in order to distinguish it from other adaptors that may also be detectable via wireless means. Selection of the "gear" icon provides a user interface (shown in FIG. 3G) for entering a new adaptor name, which in this example would replace the text "OBDLink MX" after completion. Notably, because a particular repair facility may use multiple adaptors 106 (e.g., an adaptor for each repair bay in the facility), embodiments described herein present a practical and efficient mechanism for setting recognizable names for each adaptor 106, to make it easier to distinguish these various adaptors 106.

For instance, the descriptive information corresponding to each adaptor may identify the physical locations of each of the adaptors. By selecting the appropriate icon representing an adaptor, a user can cause the computing device to establish a connection with the adaptor based on this physical location. See, for example, the user interface shown in FIG. 3H, which illustrates adaptors that are physically located in Repair Bay 01 and Repair Bay 02, and which have corresponding adaptor names identifying their physical locations. In this example, the computing device 102 can identify an adaptor to communicate with and can establish a connection between the apparatus and an adaptor based on the physical locations of the adaptors. In some embodiments, the adaptors 106 may transmit physical location information in response to an initial scan for compatible adaptors 106. In such embodiments, the descriptive information identifying the physical location of the adaptors may be generated based in part on the physical location information transmitted by the adaptors 106.

Figure 4A:
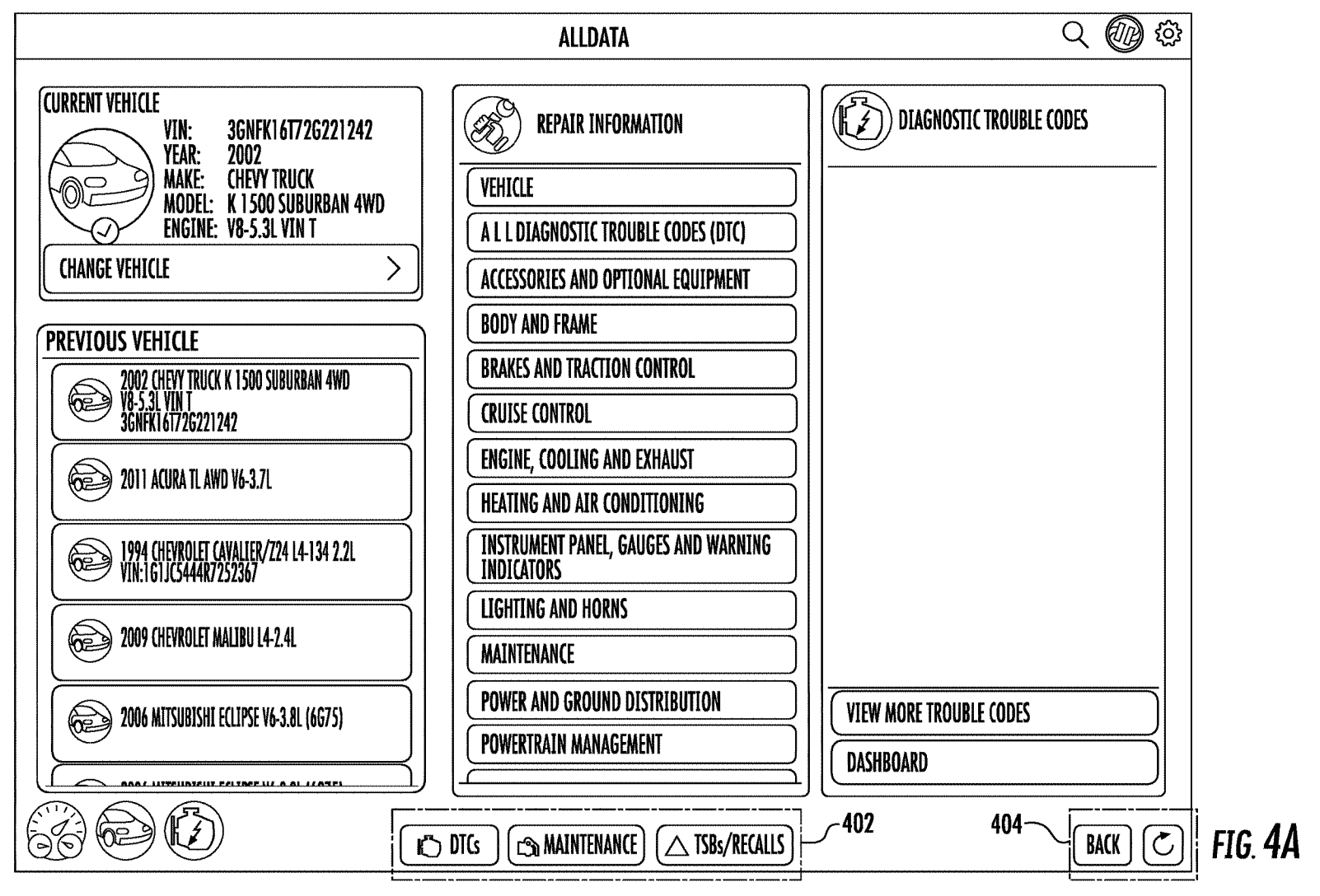
Figure 4B:
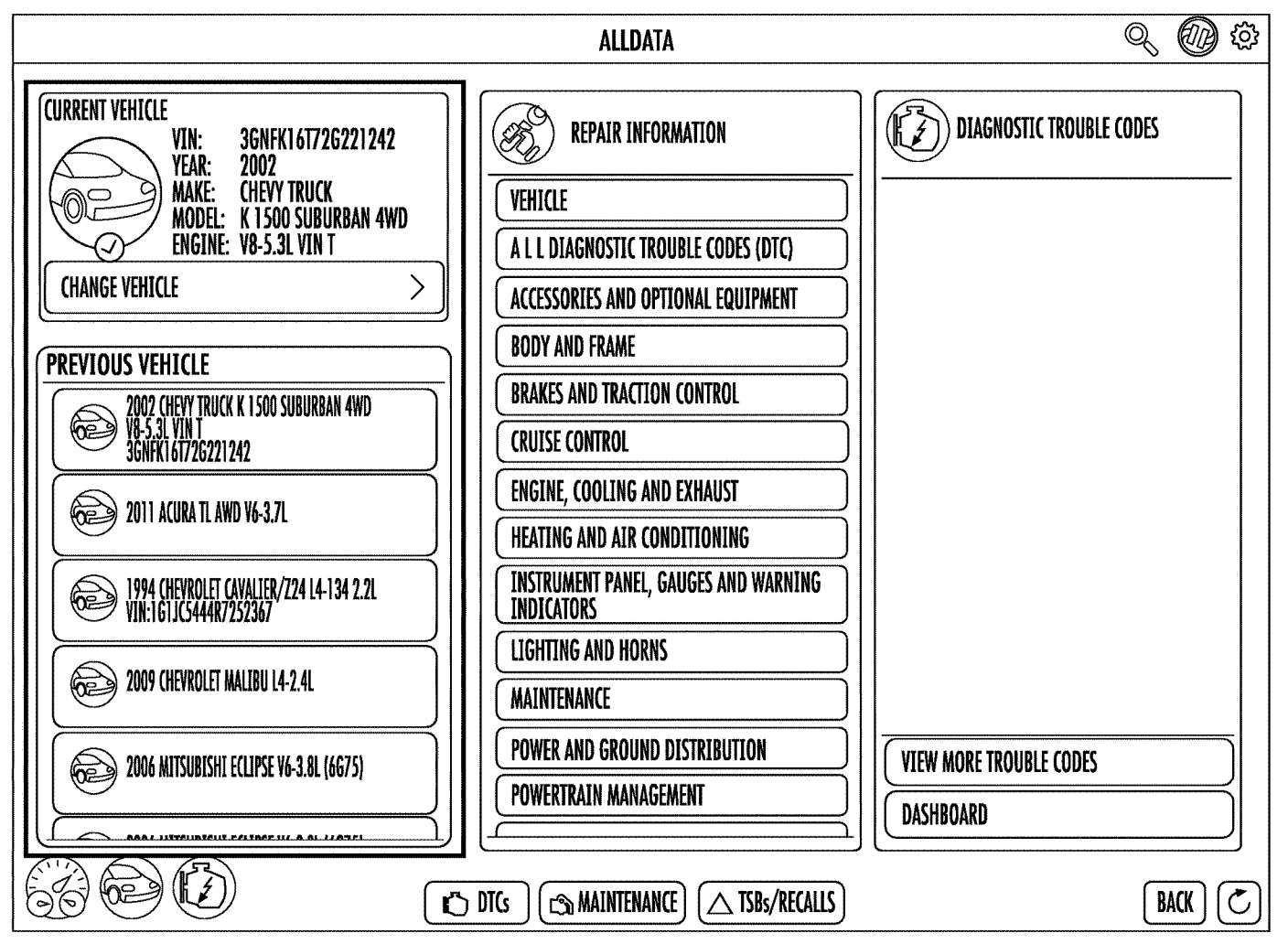
Figure 4F:
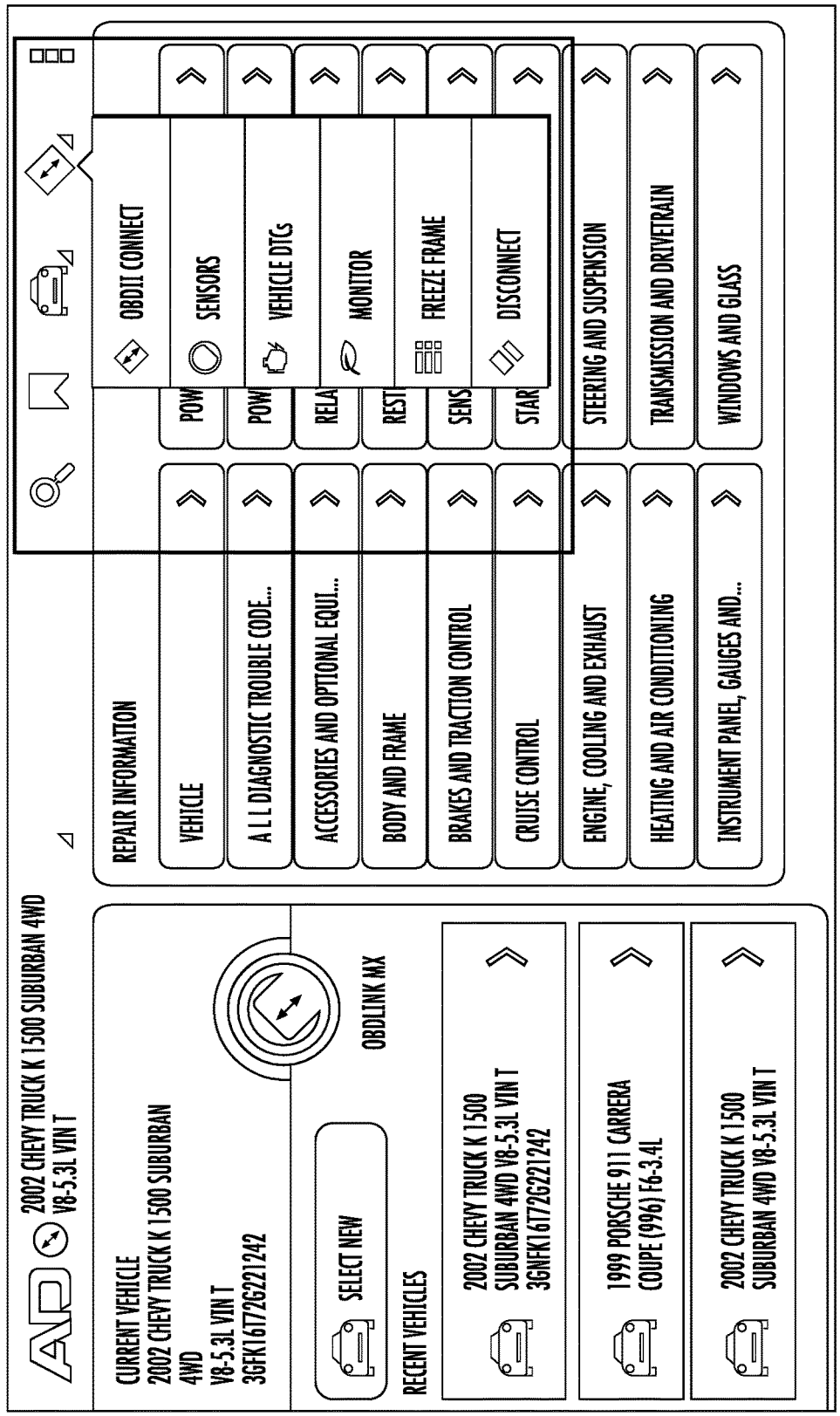

Turning now to FIG. 4A, a main screen interface is illustrated that may be displayed to a technician by user interface 206. The icons in box 402 are shortcuts to specific types of information from server 104. In some embodiments, these shortcuts describe frequently queried DTCs, frequently viewed maintenance information, and information regarding technical service bulletins and product recalls. The icons in box 404 comprise a refresh icon, which refreshes the current display, and a back icon, that returns the technician to the previous window. In some embodiments, the icons contained in box 402 (illustrated in the example shown in FIG. 4A in the bottom middle of the screen) may be located elsewhere, so long as they are accessible by user interaction with the user interface 206. FIGS. 4B through 4D highlight the three columns of information presented by the application. The left column, highlighted in FIG. 4B, illustrates vehicle information about a currently connected vehicle (identified in the manner discussed below in conjunction with FIGS. 5A through 5C), and a list of previously selected and/or diagnosed vehicles. This list may be independently scrollable, depending on the number of vehicles that have previously been loaded by the interface. The middle column, highlighted in FIG. 4C, contains a set of icons selectable to receive more granular repair information regarding the various systems of the selected vehicle. This list may independently scroll to reveal additional repair information that may not fit onto the display. Finally, the right column, as shown in FIG. 4D, contains vehicle diagnostic trouble codes that have been stored by the computing device 102 and that are retrieved when connected to a vehicle's computer. This column may also independently scroll based on the number of DTCs stored and/or downloaded. As shown in FIG. 4E, in some embodiments described herein, user interface 206 may include the vehicle information column and the repair information column, but need not include a column of diagnostic trouble codes, which may instead be accessible from an alternative location in the user interface 206. For instance, FIG. 4F illustrates a drop-down menu enabling a user to view separate vehicle diagnostics displays, which are described below in association with FIGS. 4G through 4J.

Figure 4G:
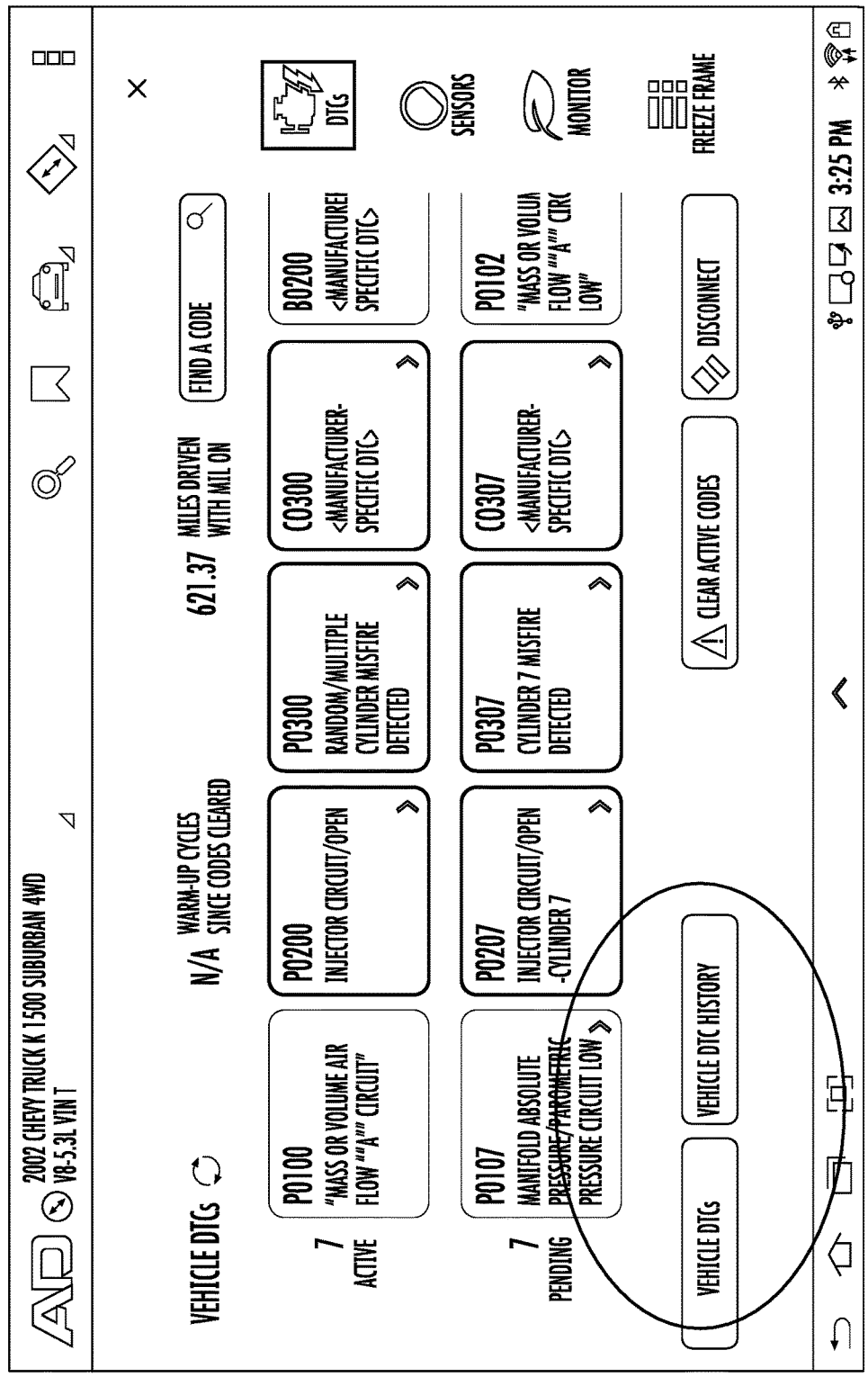
Figure 4H:
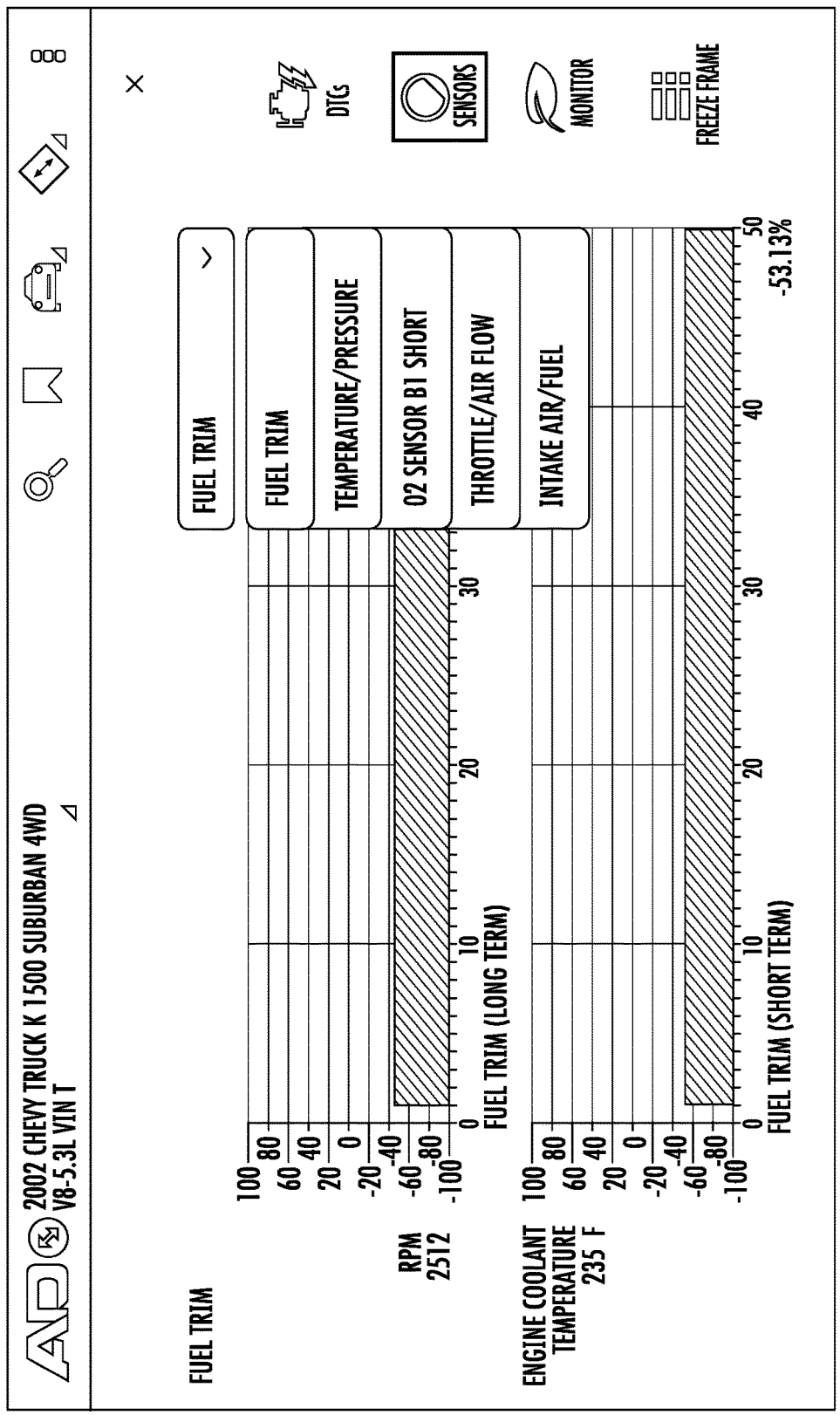

FIG. 4G illustrates an example of a vehicle diagnostics display that illustrates a similar set of information as illustrated in the right column highlighted in FIG. 4D. FIG. 4H illustrates an example vehicle diagnostics display illustrating sensor value information. Selection of a preferred PID from the drop-down menu within this display illustrates the corresponding sensor value information.

Figure 4I:
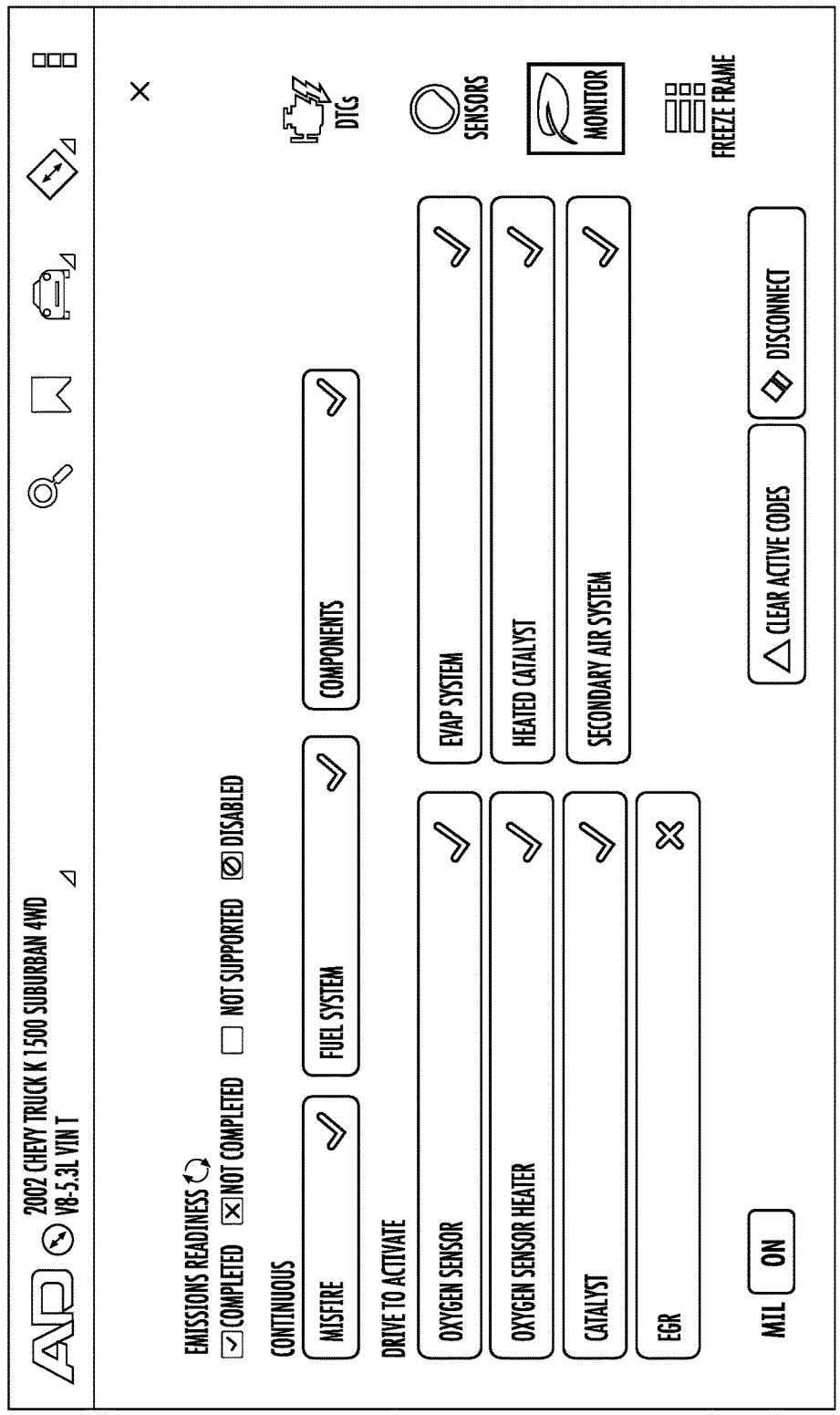

FIG. 4I presents an example emissions readiness display, which illustrates various systems and subsystems that may be monitored. In this display, "Continuous" monitors are running at all times, while "Drive to Activate" monitors must complete full drive cycles or meet specific operating conditions to activate. As can be seen in the example shown in FIG. 4I, the "EGR" is not active. The "MIL" icon displays the status of the vehicle's malfunction indicator light. As with the similar icon in FIGS. 4G through 4J, the "Clear Active Codes" icon clears all active codes that are currently being held by the vehicle's ECU, which in this case will also reset all emissions readiness monitors. Finally, the "Disconnect" icon terminates the connection from the tablet to the vehicle.

Figure 4J:
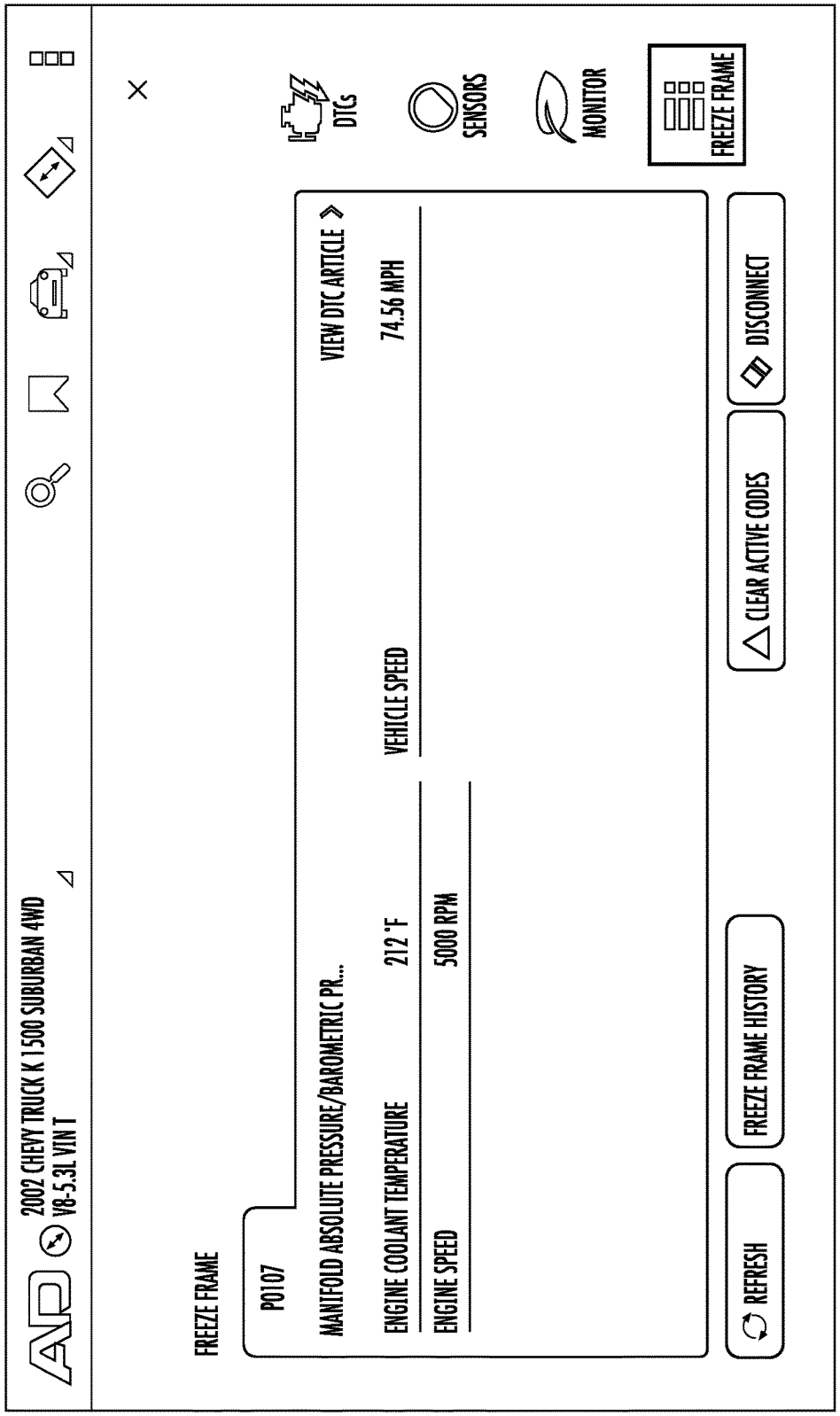

Finally, FIG. 4J illustrates an example vehicle diagnostics freeze frame display. This display illustrates the PID values associated with a specific DTC at the moment the DTC occurred, to provide a better idea of what conditions the vehicle was under when the DTC was set. The freeze frame display illustrates the DTC number and description, as well as all available freeze frame data. If multiple DTCs exist, freeze frame information may be shown only for the first DTC. Selection of the "View DTC Article" icon opens a corresponding troubleshooting article for the specified DTC. Selection of the "Refresh" icon refreshes the page with the most current freeze frame data. Selection of the "Freeze Frame History" icon displays previously captured DTC freeze frame data.

Figure 5A:
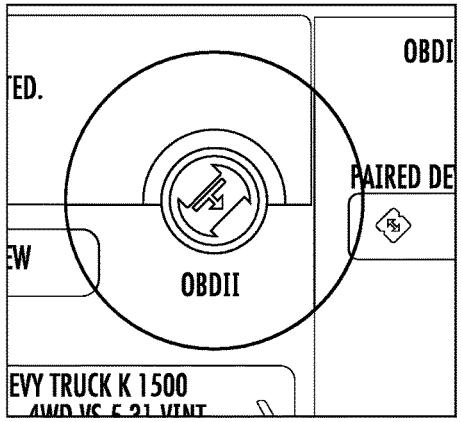
Figure 5B:
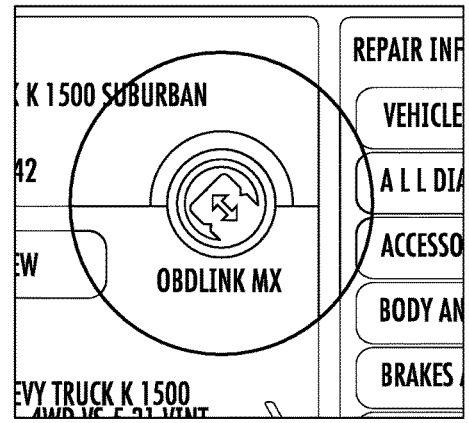
Figure 5C:
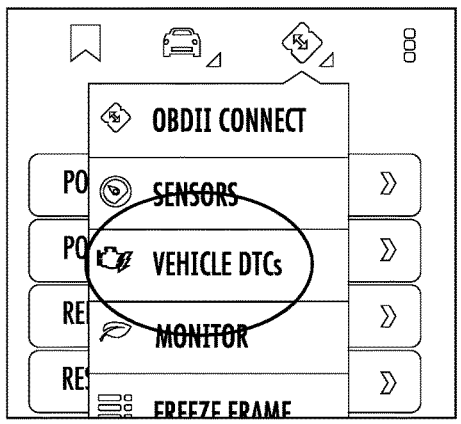

Turning now to FIGS. 5A through 5C, the application may automatically gather VIN and YMME information, and capture DTCs from the vehicle. In this regard, the computing device 102 is configured to identify the specific vehicle under examination, thereby avoiding the need to enter such identifying information by hand, which in traditional systems takes time and introduces opportunities for error. Accordingly, embodiments of the present invention are able to mitigate data entry errors by reducing the need for human involvement in VIN and/or YMME identification. To gather the VIN and YMME information of the vehicle, the technician selects the "connect" icon located centrally in FIG. 4E (and located, alternatively, in the top right corner of FIG. 4A), a zoomed-in illustration of which is shown in FIG. 5A. Upon selection of this icon, the computing device 102 retrieves the VIN and YMME information for the vehicle and displays it to the user in the left column (shown in FIGS. 4B and 4E) displayed on the user interface 206. In this regard, each computing device 102 (or technician or repair facility) may have a user account and associated user identifier, which may be maintained by server 104. Upon connection to the vehicle, all information collected regarding the vehicle may be uploaded to server 104 and stored in a historical database for future reference by the computing device 102, the technician (or another technician at the repair facility). As a result, embodiments of the present invention enable the creation and maintenance of a history of repair information regarding individual vehicles, which in turn may nurture loyalty by the technician or repair facility. While this information may be stored by server 104, this user account information may additionally or alternatively be stored locally by the computing device 102.

A successful connection is shown in FIG. 5B, after codes may be retrieved from the vehicle and stored by the computing device 102 for display via user interface 206, and may further be transmitted to the server 104 for storage in association with the user's account and the YMME and/or VIN information previously retrieved. Subsequently, any generated codes can be previewed (in the right column in FIG. 4D) on the main screen displayed by user interface 206, or in alternative embodiments, in the DTC pane shown in FIG. 4G. In this regard, to view and clear active codes captured from the connected vehicle, the technician may select "Vehicle DTC history," a selectable icon located, in some embodiments, in the vehicle diagnostics display shown in FIG. 4G, a zoomed-in illustration of which is shown in FIG. 5C.

Figure 5D:
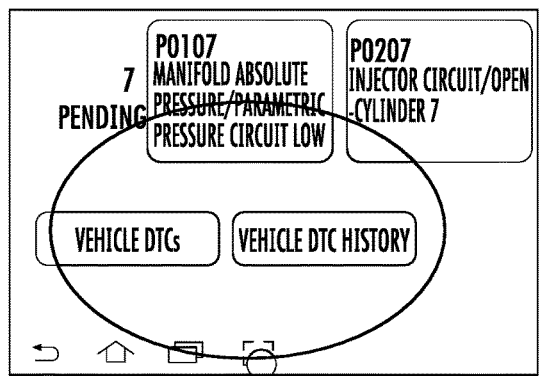

In some embodiments, the technician may be able to select a "Vehicle DTCs" tab or "Vehicle DTC History" tab, as shown in FIG. 5D. Upon selection of the "Vehicle DTCs" tab, the technician can either click a listed code to view DTC repair information, or clear codes by selecting a "Clear Codes" button. Clicking a listed code to view DTC repair information initiates a query from computing device 102 to server 104 keyed on the specific code selected. Because each code is associated with unique repair and/or diagnostic data in server 104, this query returns the relevant information for display by user interface 206 of the computing device 102. Upon selection of the "Vehicle DTC History" tab, computing device 102 can retrieve historical codes for the vehicle from the technician's user account and/or repair facility's account at server 104. This historical DTC information is then displayed to the technician via user interface 206.

Figure 5E:
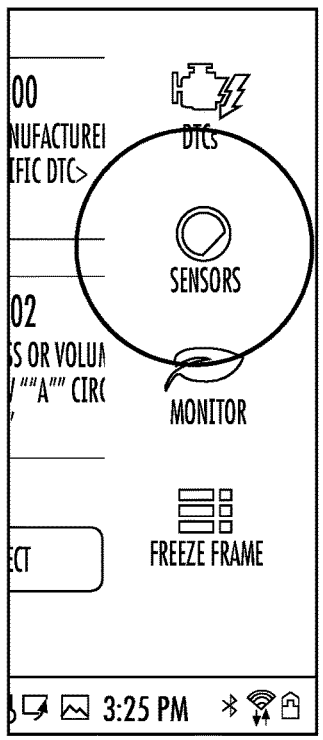
Figure 5F:
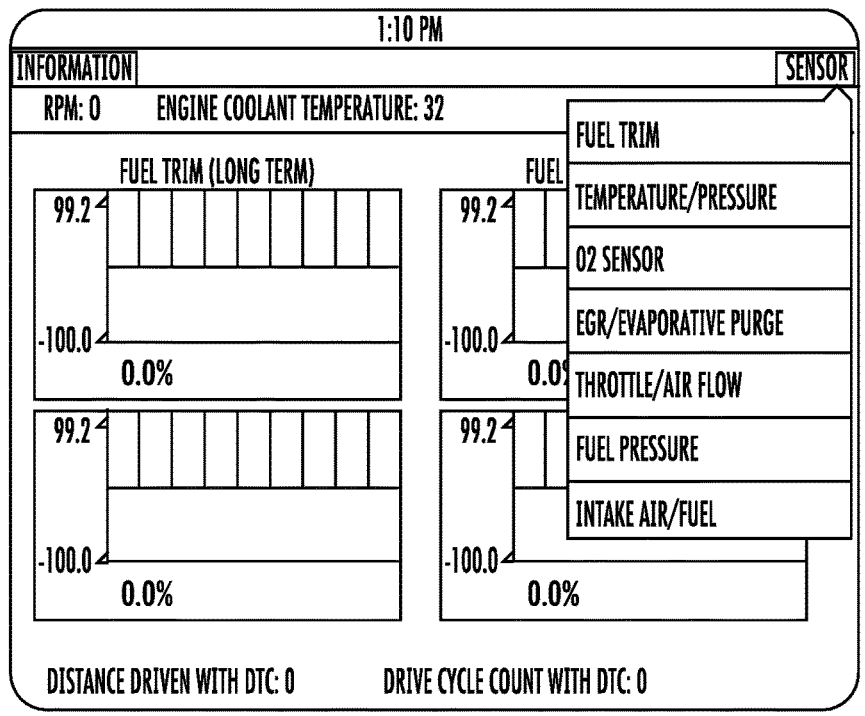
Figure 5G:
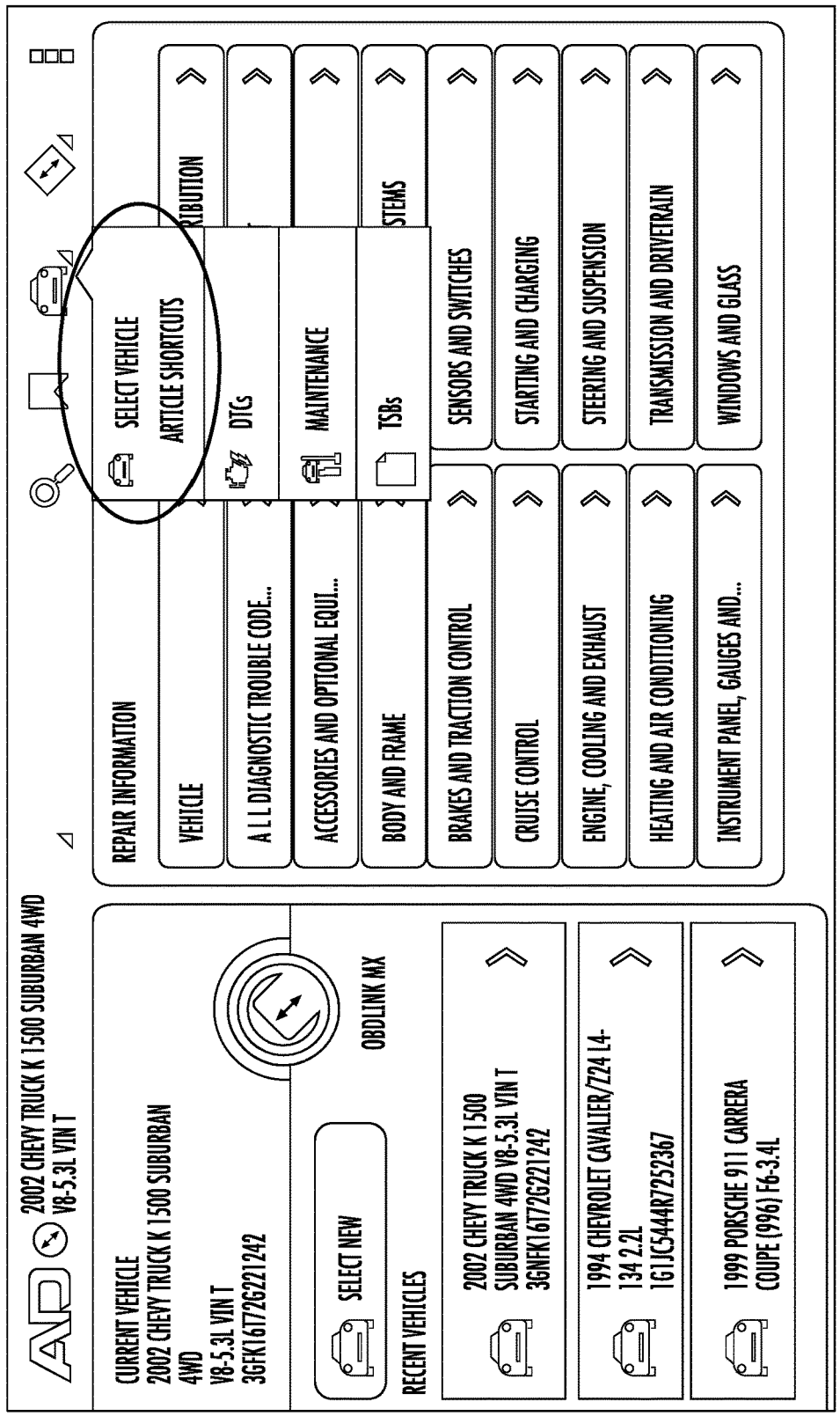
Figure 5H:
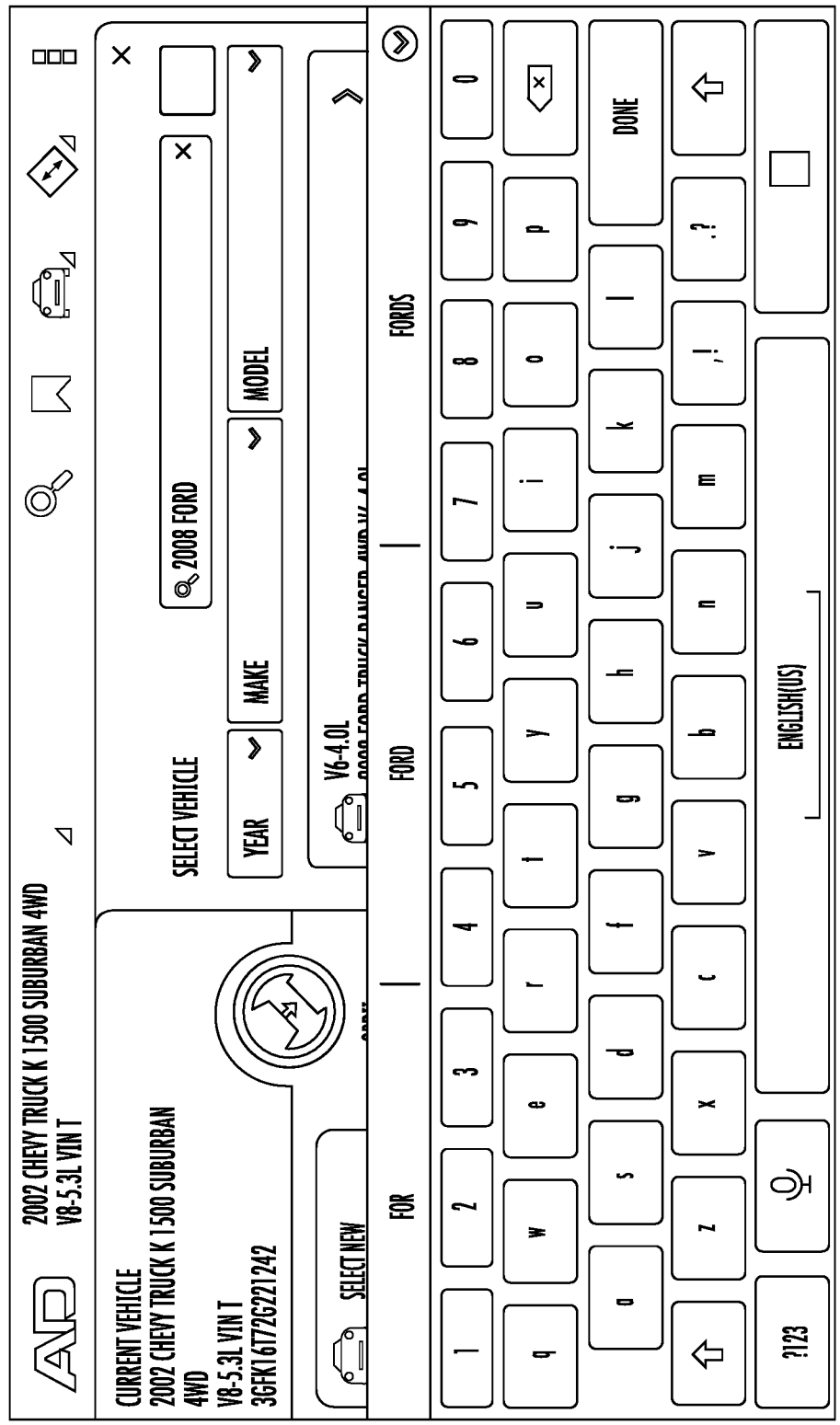

To view specific PID information while connected to the vehicle (which in some embodiments comprises real-time sensor data retrieved from the vehicle via vehicle interface 210), the technician may either select the "Sensors" button shown in FIG. 5C, or the 'Sensors" icon shown in FIG. 5E. Subsequently, to navigate through supported PID's, the technician may selectnavigate to the "Sensors" display within the top right of the resulting user display, as shown in FIG. 4H, another example embodiment of which is shown in FIG. 5F. Each supported PID may then be used to query the vehicle for relevant DTCs.

In some embodiments, the technician may change the vehicle under evaluation. In one such embodiment described above, by selecting the "connect" button, the VIN and YMME information of a currently-connected vehicle may be retrieved, via a vehicle interface 210, from the adaptor 106, and that vehicle's data may be automatically selected. Alternatively, by selecting the "Change Vehicle" button within the "Current Vehicle" frame in the left column on the main screen (highlighted in FIG. 4B) or using the "Select New" button shown FIG. 4E, or by selecting the car icon shown in FIG. 5G, the technician may manually select another vehicle. When the vehicle selection screen 5H appears, the technician may enter the year, make, and model within drop-down menus, and then select an engine type, or alternatively may manually enter vehicle identifying information in the text field. In some embodiments, the technician may also enter search terms in the text field, in response to which relevant previous vehicles may be presented (for instance, if a technician enters the search term "03 MDX," the list may be populated with a 2003 Acura MDX for selection). To quickly select previously viewed vehicles, the technician may also select one of the vehicles listed in the "Previous Vehicles" frame located in the left column on main screen (highlighted in FIG. 4B or shown on the left portion of the display shown in FIG. 4E).

Figure 5I:
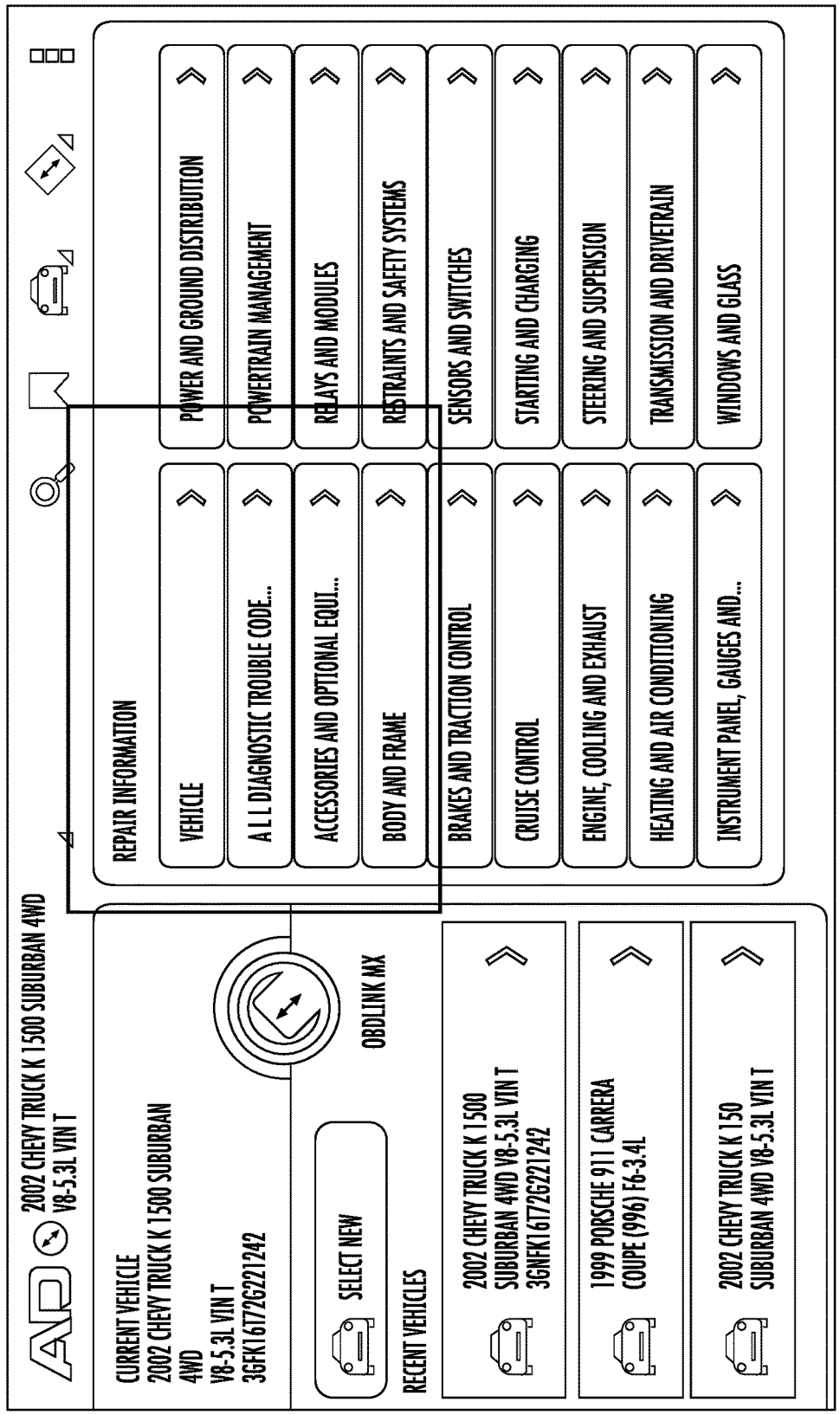
Figure 5J:
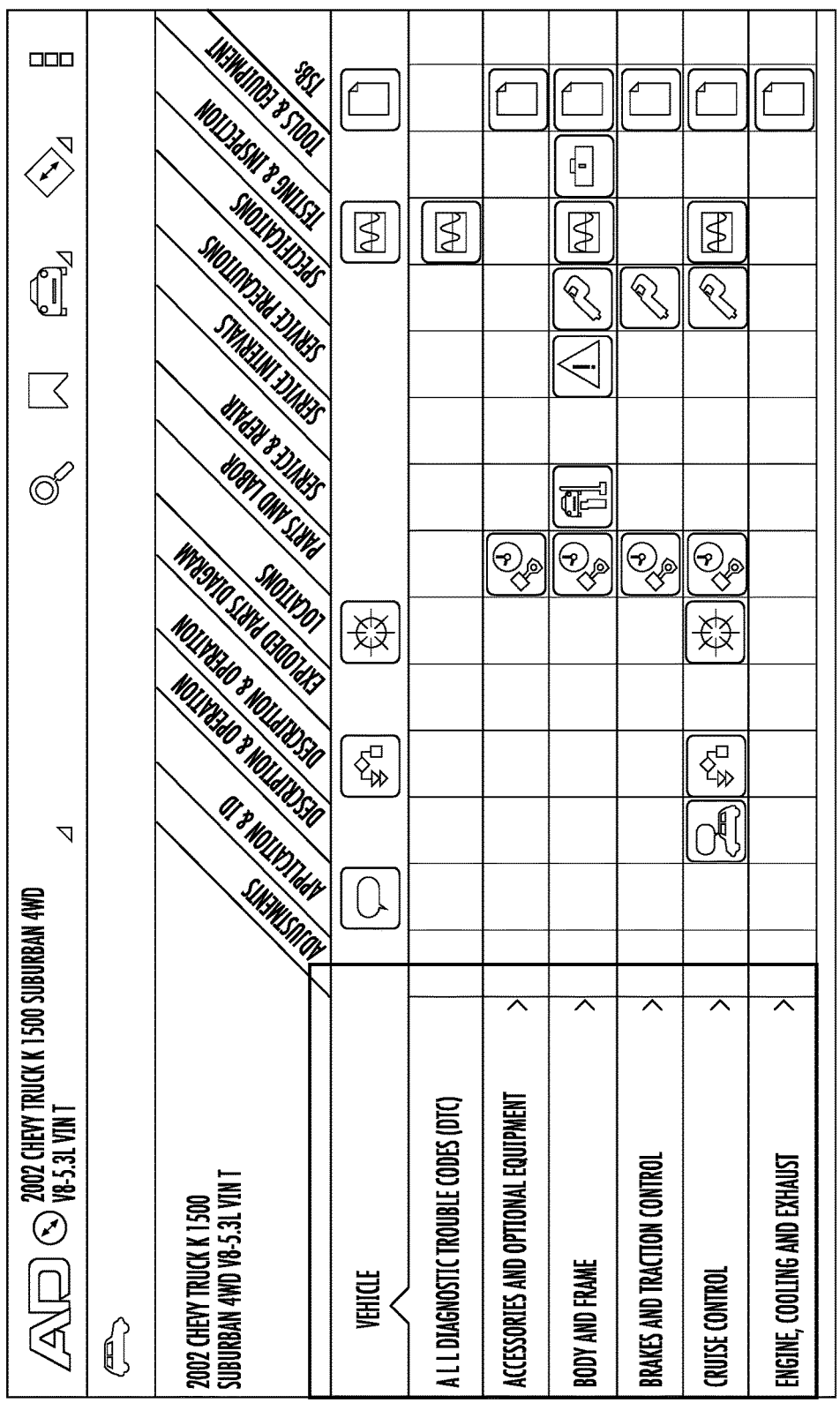

Moreover, the technician may access specific repair information from the main screen by either selecting a specific system or the vehicle button within the center column (highlighted in FIG. 4C), a zoomed-in illustration of which is shown in FIG. 5I. As noted above, the computing device 102 retrieves this specific repair information for display by sending a corresponding query to server 104. By selecting the "Vehicle" icon, the technician may view the "Repair Information Home" screen shown in FIG. 5K. To navigate to specific components of the vehicle, the technician may select the "System" folder, "Sub-System" folder, and then continue to the associated component, shown in FIG. 5J. In this regard, different colors or other distinctions may be graphically indicated to represent whether there is additional information within a section. In one embodiment, blue folders may indicate that additional information is available within that section, while gray folders indicate components or the end of the navigation path.

Figure 5K:
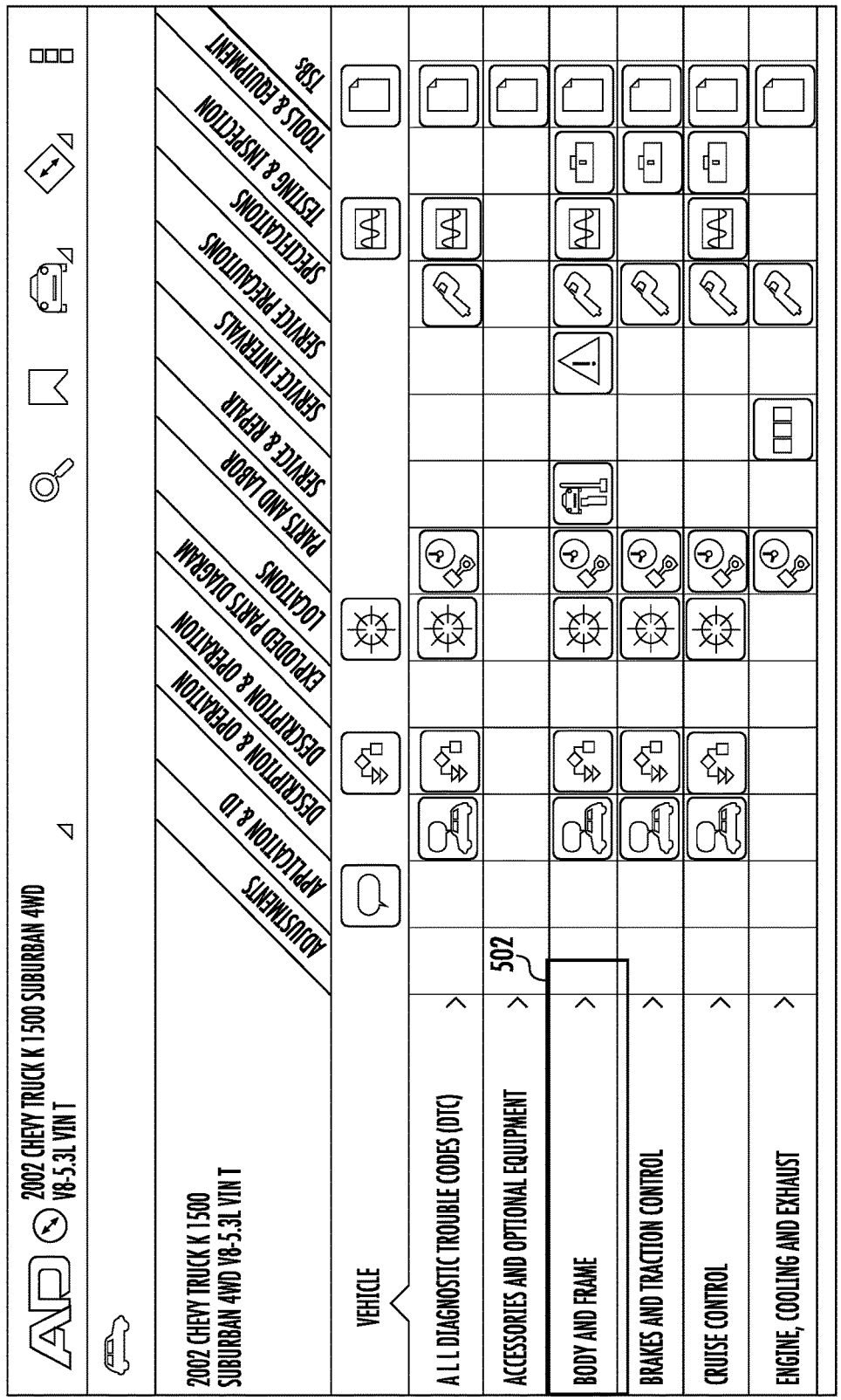
Figure 5L:
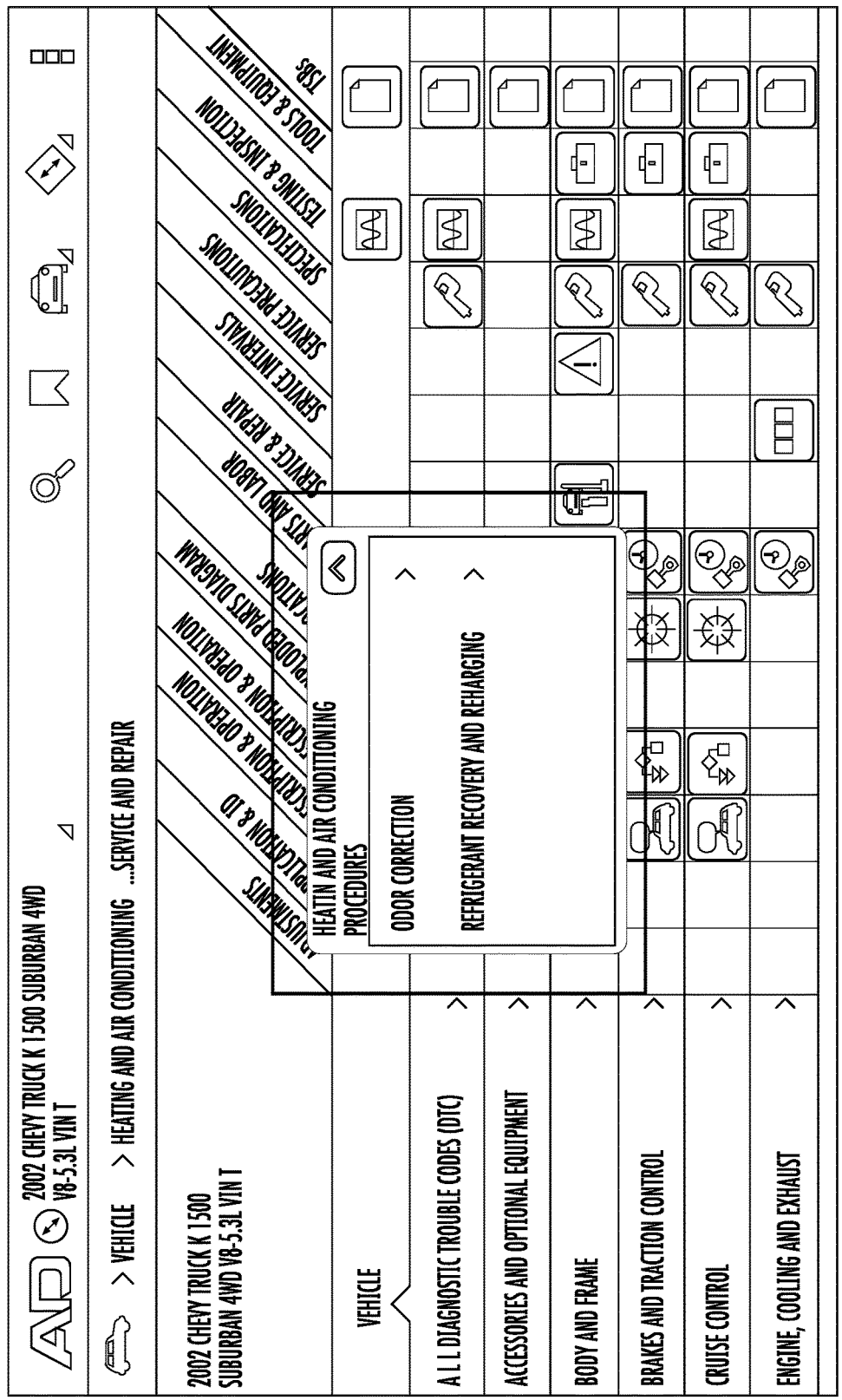

Supported information types are represented by icons and defined within the header with their associated label, as shown in FIG. 5K. Within each system or sub-system row, information type icons display, within a grid, where information is supported, as further shown in FIG. 5K. The technician may navigate through each information type by selecting the corresponding icon (e.g., Heating and Air Conditioning icon 502), and then selecting the required label within a fly-out window shown in FIG. 5L. If there is only a single option, however, this fly-out may not be displayed.

Figure 5M:
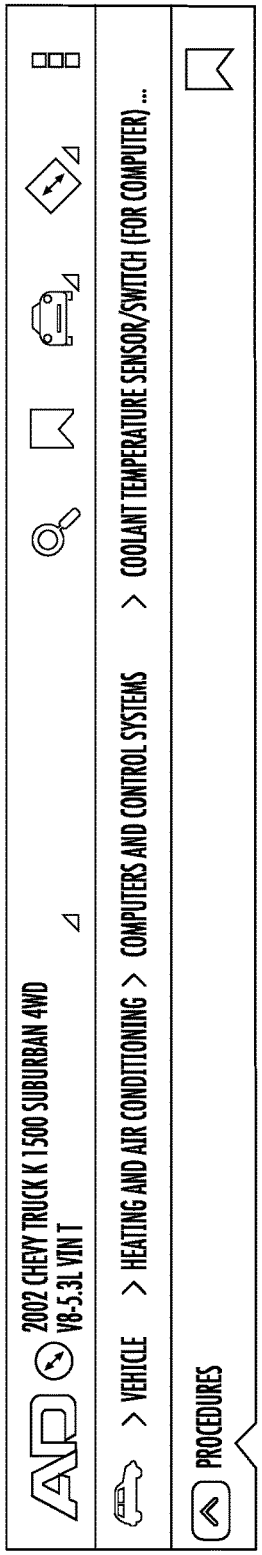
Figure 5M:
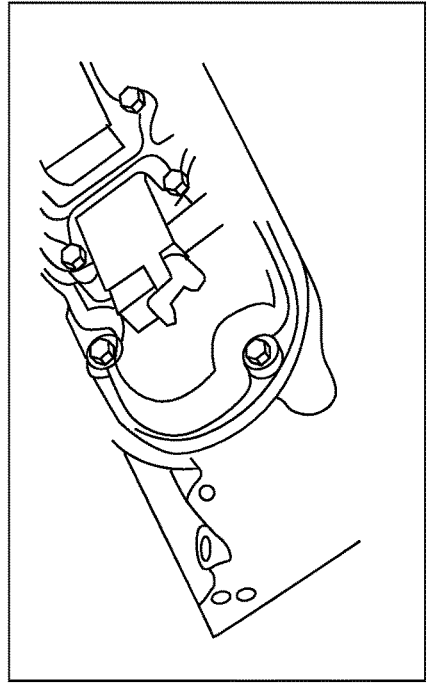

By navigating through the folders and icons presented iteratively via a frame such as that illustrated in FIG. 5K, the technician can locate icons representing relevant repair information. By selecting on an icon, the computing device 102 can retrieve a corresponding repair article via a query to server 104 and may subsequently display the repair article via user interface 206, as shown in FIG. 5M.

Using this navigation functionality, a technician may be served relevant repair information and identify diagnostic trouble codes (DTCs) as part of an initial diagnostic process. As noted above, this functionality accordingly bridges the gap between repair information products and vehicle connectivity products. Moreover, using OBD PIDs, embodiments of the present invention are able to correlate received codes to specific repair articles, and store either the codes, the repair articles, or both, in association with a user account and the affected vehicle's VIN.

Although a particular example interfaces are described above, it will be understood that these descriptions are for example only, and the location, size, shape, and other characteristics of the above user interface elements may be changed or modified without departing from the spirit of this invention.

Accordingly, embodiments of the present invention provide repair information with the convenience, reliability, durability, and low operational cost of tablet application technology. Further, the present invention enables technicians to transport repair information anywhere as needed, with expanded functionality not available through traditional systems. Finally, embodiments of the present invention overcome the inefficiencies of traditional vehicle maintenance systems, and provide a competitive advantage to maintenance facilities.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and other illustrations of methods, apparatuses, systems and computer program products. It will be understood that each block of the diagrams and process illustrations, and combinations of blocks in the circuit diagrams and process illustrations, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, constituent elements of the block diagrams and illustrations support combinations of means for performing the specified functions, combinations of steps for performing the specified functions and program instruction means for performing the specified functions. It will also be understood that each block of the circuit diagrams and process illustrations, and combinations of blocks in the circuit diagrams and process illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the present invention. Although specific terms are employed herein, they are used in a generic and descriptive sense only and not for purposes of limitation.

What is claimed is:

1. An apparatus for vehicle diagnosis and repair, the apparatus comprising:
   a vehicle interface configured to
      identify one or more adaptors with which the apparatus may communicate,
      establish a connection between the apparatus and a first adaptor of the one or more adaptors, wherein establishing the connection is based on the first adaptor being located at a first physical location and connected to a vehicle,
      send, via a Bluetooth™ transmission, one or more instructions to the first adaptor,
      retrieve, from the first adaptor via a Bluetooth™ transmission, a vehicle identification number of the vehicle, and an indication of one or more diagnostic trouble codes;
   a communication module configured to
      transmit, to a remote server, the vehicle identification number of the vehicle or a user identifier associated with the apparatus,
      receive, from the remote server, historical information regarding the user identifier,
      transmit, to the remote server, the retrieved indication of the one or more diagnostic trouble codes and at least one of the user identifier or the vehicle identification number, and
      receive, from the remote server, repair information based on the one or more diagnostic trouble codes, the user identifier, or the vehicle identification number;
   a memory configured to store information received from the vehicle interface or the communication module;
   a user interface configured to
      display icons representing the one or more diagnostic trouble codes, and
      receive, via touch screen selection of a displayed icon, a user request for information regarding a corresponding diagnostic trouble code,
      display a portion of the repair information received from the remote server relating to the corresponding diagnostic trouble code; and
   a processor configured to control the vehicle interface, the communication module, the memory, and the user interface.

2. The apparatus of claim 1, wherein the apparatus comprises a tablet computing device.

3. The apparatus of claim 1, wherein the communication module is further configured to receive, from the remote server, diagnostic predictions in response to transmission of the retrieved indication of the one or more diagnostic trouble codes and at least one of the user identifier or the vehicle identification number.

4. The apparatus of claim 1,
   wherein the user interface is further configured to
      display one or more icons including descriptive information regarding the one or more adaptors, the descriptive information identifying the physical locations of each of the one or more adaptors,
      receive, via touch screen selection of icon representing the first adaptor, a user request to establish a connection with the first adaptor based on the first adaptor being located at the first physical location.

5. The apparatus of claim 1, wherein the user interface is further configured to:
   display information indicating a status of each of the one or more diagnostic trouble codes.

6. The apparatus of claim 1, wherein the user interface is further configured to:
   display information representing a set of recent vehicles;
   receive an indication of user selection of one of the set of recent vehicles; and
   display information regarding active diagnostic trouble codes and pending diagnostic trouble codes of the one of the set of recent vehicles.

7. The apparatus of claim 1, wherein the user identifier does not include a vehicle identification number or year, make, model, or engine information.

8. A computer-readable storage device for vehicle diagnosis and repair, the computer-readable storage device storing computer program instructions that, when executed by a processor, cause a computing device to:
   send a Bluetooth™ transmission including one or more instructions to a first adaptor connected to a vehicle;
   retrieve, from the first adaptor, a Bluetooth™ transmission including an indication of one or more diagnostic trouble codes from the first adaptor;
   retrieve, from the first adaptor, a Bluetooth™ transmission including a vehicle identification number of the vehicle;
   transmit, to a remote server, the vehicle identification number of the vehicle or a user identifier associated with the computing device;
   receive, from the remote server, historical information regarding the user identifier;
   transmit, to the remote server, the retrieved indication of the one or more diagnostic trouble codes and at least one of the user identifier or the vehicle identification number;
   receive, from the remote server, repair information based on the one or more diagnostic trouble codes, the user identifier, or the vehicle identification number;
   display icons representing the one or more diagnostic trouble codes;
   receive, via touch screen selection of a displayed icon, a user request for information regarding a corresponding diagnostic trouble code; and
   display a portion of the repair information received from the remote server and relating to the corresponding diagnostic trouble code.

9. The computer-readable storage device of claim 8, wherein the computing device comprises a tablet computing device.

10. The computer-readable storage device of claim 8, wherein the computer program instructions, when executed by a processor, further cause the computing device to:

receive, from the remote server, diagnostic predictions in response to transmission of the retrieved indication of the one or more diagnostic trouble codes and at least one of the user identifier or the vehicle identification number.

11. The computer-readable storage device of claim 8, wherein the computer program instructions, when executed by a processor, further cause the computing device to, prior to transmitting the one or more instructions to the first adaptor:
- identify one or more adaptors with which the apparatus may communicate, wherein the first adaptor comprises one of the one or more adaptors;
- display icons representing each of the one or more adaptors;
- receive, via touch screen selection of one of the icons representing the first adaptor, a user request to establish a connection with the first adaptor;
- determine whether the one or more adaptors are connected to respective vehicles; and
- in response to receiving the user request, establish a connection between the apparatus and the first adaptor.

12. The computer-readable storage device of claim 8, wherein the computer program instructions, when executed by a processor, further cause the computing device to:
- display information indicating a status of each of the one or more diagnostic trouble codes.

13. The computer-readable storage device of claim 8, wherein the computer program instructions, when executed by a processor, further cause the computing device to:
- display information representing a set of recent vehicles;
- receive an indication of user selection of one of the set of recent vehicles; and
- display information regarding active diagnostic trouble codes and pending diagnostic trouble codes of the one of the set of recent vehicles.

14. The computer-readable storage device of claim 9, wherein the user identifier does not include a vehicle identification number or year, make, model, or engine information.

15. An apparatus for vehicle diagnosis and repair, the apparatus comprising:
- a vehicle interface configured to
  - send, via a Bluetooth™ transmission, one or more instructions to a first adaptor, wherein the first adaptor is connected to a vehicle,
  - retrieve, from the first adaptor via a Bluetooth™ transmission, a vehicle identification number of the vehicle, and an indication of one or more diagnostic trouble codes;
- a communication module configured to
  - transmit, to a remote server, the vehicle identification number of the vehicle or a user identifier associated with the apparatus,
  - receive, from the remote server, historical information regarding the user identifier,
  - transmit, to the remote server, the retrieved indication of the one or more diagnostic trouble codes and at least one of the user identifier or the vehicle identification number, and
  - receive, from the remote server, repair information based on the one or more diagnostic trouble codes, the user identifier, or the vehicle identification number;
- a memory configured to store information received from the vehicle interface or the communication module;
- a user interface configured to
  - display one or more icons including descriptive information regarding one or more adaptors with which the apparatus may communicate, the descriptive information identifying the physical locations of each of the one or more adaptors, wherein the first adaptor comprises one of the one or more adaptors,
  - receive, via touch screen selection of icon representing the first adaptor, a user request to establish a connection with the first adaptor based on the first adaptor being located at the first physical location,
  - display icons representing the one or more diagnostic trouble codes,
  - receive, via touch screen selection of a displayed icon, a user request for information regarding a corresponding diagnostic trouble code, and
  - display a portion of the repair information received from the remote server relating to the corresponding diagnostic trouble code; and
- a processor configured to control the vehicle interface, the communication module, the memory, and the user interface.

16. The apparatus of claim 15, wherein the apparatus comprises a tablet computing device.

17. The apparatus of claim 15, wherein the vehicle interface is further configured to:
- identify the one or more adaptors with which the apparatus may communicate; and
- establish a connection between the apparatus and the first adaptor based on the first adaptor being located at the first physical location and connected to the vehicle.

18. The apparatus of claim 15, wherein the user interface is further configured to:
- display information indicating a status of each of the one or more diagnostic trouble codes.

19. The apparatus of claim 15, wherein the user interface is further configured to:
- display information representing a set of recent vehicles;
- receive an indication of user selection of one of the set of recent vehicles; and
- display information regarding active diagnostic trouble codes and pending diagnostic trouble codes of the one of the set of recent vehicles.

20. The apparatus of claim 15, wherein the user identifier does not include a vehicle identification number or year, make, model, or engine information.

* * * * *